(12) United States Patent
Akers et al.

(10) Patent No.: US 6,848,390 B2
(45) Date of Patent: *Feb. 1, 2005

(54) SHAPE MEMORY THERMAL EXPOSURE MONITOR

(76) Inventors: Jeffrey W. Akers, 1411 Anthony St., Columbia, MO (US) 65201; James Michael Zerkus, 6671 W. Indiantown Rd., Ste. 56 #383, Jupiter, FL (US) 33458

(*) Notice: Subject to any disclaimer, the term of this patent is extended or adjusted under 35 U.S.C. 154(b) by 0 days.

This patent is subject to a terminal disclaimer.

(21) Appl. No.: 10/201,385

(22) Filed: Jul. 23, 2002

(65) Prior Publication Data

US 2003/0188677 A1 Oct. 9, 2003

Related U.S. Application Data

(63) Continuation-in-part of application No. 09/301,418, filed on Apr. 28, 1999, now Pat. No. 6,425,343.

(51) Int. Cl.[7] .............................. G01K 1/02; G01K 3/00; G01K 5/00
(52) U.S. Cl. ...................... 116/216; 374/187; 374/205
(58) Field of Search ................................ 116/216, 221, 116/207; 374/102, 104, 106, 187, 205–207; 426/88

(56) References Cited

U.S. PATENT DOCUMENTS 2,966,261 A * 12/1960 Bradbury .................... 206/306
3,214,278 A * 10/1965 Mylo .......................... 116/221
3,483,752 A * 12/1969 Rogen et al. ............... 116/216
4,114,559 A * 9/1978 Rogen ......................... 116/216
4,448,147 A * 5/1984 Dewaegheneire ........... 116/216
5,335,994 A * 8/1994 Weynant nee Girones .. 374/205
5,531,180 A * 7/1996 Bianchini .................... 116/216
5,735,607 A * 4/1998 Shahinpoor et al. ........ 374/187

* cited by examiner

Primary Examiner—Diego Gutierrez
Assistant Examiner—Yaritza Guadalupe
(74) Attorney, Agent, or Firm—Kenneth A. Roddy

(57) ABSTRACT

A cumulative thermal exposure monitor (10) having a housing (11) with a fluid sealed interior cavity (16) and a thermally-responsive member (20) therein formed of a shape memory material which moves an indicator (21), wherein the thermal properties of the housing, cavity, and shape memory material transition temperature range are calibrated relative to one another to function in mutual cooperation such that the thermally-responsive member gradually changes from a first shape to a second shape upon absorption of heat energy over time to closely match a thermal deterioration profile of a perishable product, and to indicate the cumulative amount of heat energy absorbed and whether, at any time, the temperature has been above a preferred storage temperature range for a period of time sufficient to cause any degree of deterioration based on a known time and temperature thermal deterioration profile of the perishable product.

20 Claims, 9 Drawing Sheets

Growth of Micro-organisms - - Temperature Controlled

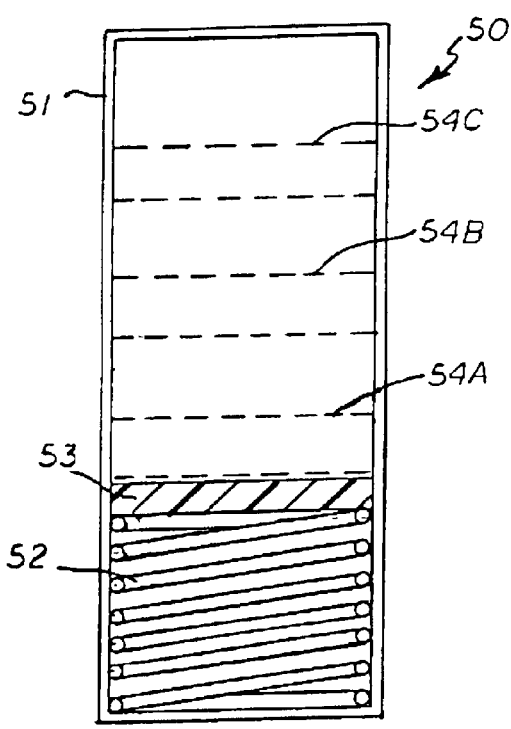 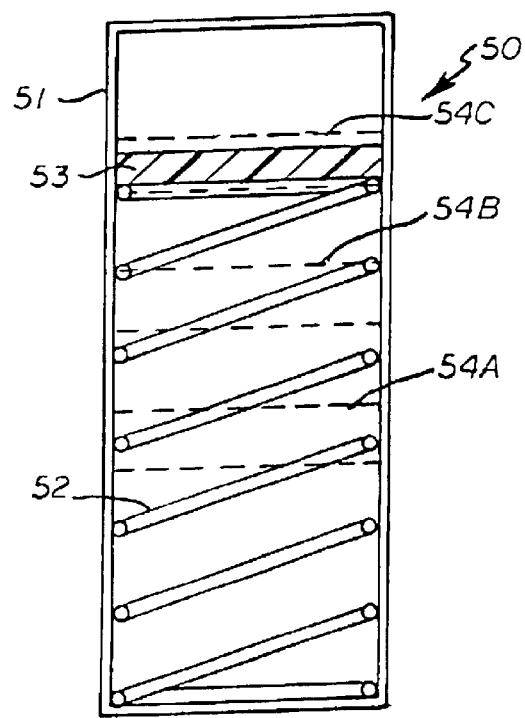
*Fig. 9A*  *Fig. 9B*

SHAPE MEMORY THERMAL EXPOSURE MONITOR

CROSS REFERENCE TO RELATED APPLICATION

This application is a Continuation-In-Part of U.S. patent application Ser. No. 09/301,418, Apr. 28, 1999, now U.S. Pat. No. 6,425,343.

BACKGROUND OF THE INVENTION

1. Field of the Invention

This invention relates generally to thermal exposure monitors, and more particularly to a cumulative thermal exposure monitor having a housing with a fluid sealed interior cavity and a thermally-responsive member therein formed of a shape memory material that moves an indicator wherein the thermal properties of the housing, cavity, and shape memory material transition temperature range are calibrated relative to one another to function in mutual cooperation such that the thermally-responsive member gradually changes from a first shape to a second shape upon absorption of heat energy over time to closely match a thermal deterioration profile of a perishable product, and to indicate the cumulative amount of heat energy absorbed and whether, at any time, the temperature has been above a preferred storage temperature range for a period of time sufficient to cause any degree of deterioration based on the known time and temperature thermal deterioration profile of the perishable product.

2. Brief Description of the Prior Art

It is of utmost importance to maintain processed produce such as food products and perishable non-food products such as medical products, drugs, research reagents, pharmaceuticals, human organs and tissues, etc., within a predetermined temperature range and to determine whether such products may have been exposed to detrimental temperatures outside of a specified temperature range during some step in the chain of distribution from the source to the destination.

The demand for processed produce and perishable non-food products has pushed the limits of the distribution systems of the perishable products industry to maintain an unbroken temperature controlled chain from field to consumer and industry. Many segments of the food industry utilize a Hazard Analysis and Critical Control Point system (HACCP), which is a world-recognized, common sense approach to food safety and prevention of food contamination.

The HACCP has outlined seven principles for food safety and prevention of food contamination: (1) Conduct a hazard analysis to identify potential hazards that could occur in the food production process; (2) Identify the critical control points (CCPs)—those points in the process where the potential hazards could occur and can be prevented and/or controlled; (3) Establish critical limits for preventive measures associated with each CCP; (4) Monitor each CCP to ensure it stays within the limits; (5) Take corrective actions when monitoring determines a CCP is not within the established limits; (6) Keep records that document the HACCP system is monitored and working correctly; and (7) Verify that the HACCP system is working properly through tests and other measures.

Existing HACCP programs in place at the processing end of the chain are not equipped with proper tools to monitor all of the critical control points (CCP's) in the cold chain, and temperature related problems can still occur throughout the distribution chain. Thus, there is a need for a device that can be used for economically monitoring the links in the cold chain, especially when perishable loads are broken up and re-distributed.

Temperature monitors and indicators are known in the art. There are several patents that disclose various temperature indicating devices.

Bradbury, U.S. Pat. No. 2,966,281 teaches a "snap-action" temperature-sensing device having a thermally responsive bimetallic inverted V-shaped spring (not shape memory alloy or polymer material), and a latch insertable into the device to temporarily hold the spring member in an initial position. The apex of the V-shaped spring serves as a pointer and indicia on the housing represent zones corresponding to the location of the apex to indicate the temperature of the monitored product.

Rogen et al U.S. Pat. No. 3,483,752 discloses a temperature monitor using a shape-memory alloy sensor disposed in a compartment in a housing preferably constructed of transparent acrylic plastic that has: (1) a thin wall section that is affixed onto the package of a medium being monitored to serve as a preferential heat conducting path between the monitored medium and the sensor is affixed onto the package of a medium being monitored, and (2) a thick wall section that serves as a preferential insulating path between the sensor and the ambient environment. The sensor must respond decisively (instantaneously) to a small temperature change and can be made to actuate (change shape) more rapidly than the monitored medium, to insure that the monitored medium (blood) is either safe or unsafe, but otherwise remains dormant. This device does not utilize a scale because there is no degree of spoilage of blood (it is either considered good or bad). It also requires the user to observe the configuration of the shape memory alloy sensor (whether it is straight or coiled, curled or flat, or twisted or flat) in order to determine whether the monitored medium has exceeded the specified temperature. This device differs from the present invention in that it is strictly a binary device (it can only give you a yes or no answer), it is designed to measure whether a temperature threshold has been exceeded, and its housing merely isolates the mechanism from its environment and links it to the medium.

Dewaegheneire, U.S. Pat. No. 4,448,147; Weynant nee Girones, U.S. Pat. No. 5,018,874; and Darringer et al, U.S. Pat. No. 5,076,197 disclose "step" type temperature monitors. These devices differ from the present invention in that they merely measure and indicate whether one or more temperature thresholds have been achieved.

Bianchini, U.S. Pat. No. 5,531,180 teaches a device utilizing a pre-loaded tension spring or leaf spring (not shape memory alloy or polymer) in cooperation with a fluid material having a controlled temperature dependent viscosity, wherein the viscosity changes as a function of temperature. The spring and fluid are located in a compartment in a transparent housing or case that is affixed onto the package of a medium being monitored. The end of the spring has an enlargement or indicator in the form of a small sphere or protuberance, which is held in a first position by a removable retaining pin. After the device along with the monitored medium has been frozen, the retaining pin is removed. As a result of the viscosity of the temperature dependent fluid or material, with the elapsing of time, the pressure of the spring will cause the indicator to move to a second position to indicate that the frozen product has gone through "thermal mishandling" in is unfit for consumption.

The time required for the indicator to move to the second position is proportional to the viscosity and to the radius of the fluid friction surface (exterior surface of the spherical indicator) and inversely proportional to the elastic constant of the spring, which urges the indicator through the viscous medium, or (with the protuberance) the area perpendicular to the motion of the indicator toward the second position. This device operates on entirely different principles than the present invention and relies on the relationship of viscosity of a fluid with respect to temperature.

Shahinpoor et al, U.S. Pat. No. 5,735,607 discloses a temperature sensor having an indication surface, at least one shape memory alloy (SMA) member with a first shape at temperatures below a critical temperature and a second shape at temperatures above the critical temperature, and a plurality of indicators mounted with the members which obscure the indication surface when the members are in the first shape, and do not obscure the indication surface when the members are in their second shape. The shape change of the SMA element causes the sensor to change between two readily distinguishable states to indicate that a temperature threshold was exceeded, and must always be maintained at a temperature below the transformation temperature of the shape memory alloy member(s) until the beginning of the sensing operation.

Waynant nee Girones, U.S. Pat. No. 5,335,994 discloses a temperature monitoring device having a casing made of synthetic material that contains a motor element with it a movement transmission element consisting of a piston and rod and a shape memory alloy spring acting on at least one indicator element irreversibly to record each overstepping of a predetermined threshold temperature. The device is capable of having a variable response time ("delay time") on each of the temperature thresholds. One embodiment of the device enables the durations of the overstepping of the various temperature thresholds to be indicated. The piston and rod are supported at one end of the shape memory spring in a chamber. An optional balancing spring bears against the piston. The chamber has a second part, separated from the first by a baffle which contains a clockwork mechanism coupled to a revolution-counter mechanism, the triggering of which is effected with the aid of pushers operating a switch. At ambient temperature the balancing spring is compressed between the baffle and the piston, the switch is not operated and the clockwork movement indicates a zero duration. When the temperature falls to the set temperature the spring contracts, allowing the piston to move back which pivots the pusher, which triggers the switch and the clockwork mechanism starts to operate to indicate the duration of the low temperature based on the number of revolutions of the revolution counter.

A "temperature sensitive" product does not decay or become spoiled as a result of exposure to a given temperature; instead, it spoils due to the amount of heat imparted to it as a result of a temperature difference over time. In other words, a given product, such as a food product or produce, can safely tolerate short exposures to an elevated temperature, but not long exposures. Thus, prior art devices that merely indicate that a temperature threshold was achieved or exceeded at some point in time do not indicate the cumulative amount of heat energy absorbed within a preferred storage temperature range and whether, at any time, the cumulative heat energy absorbed has taken place for a period of time sufficient to cause any degree of deterioration based on the time and temperature thermal deterioration profile of the perishable product.

The present invention is distinguished over the prior art in general, and these patents in particular by a cumulative thermal exposure monitor for monitoring heat energy absorbed over time and indicating the degree of deterioration based on a time and temperature thermal deterioration profile of a perishable product that has a known time and temperature thermal deterioration profile and is prescribed to be maintained within a preferred storage temperature range. The device has a thermally-conductive housing with a fluid sealed interior cavity and a transparent window portion, the housing formed of a material having thermal capacity and insulative properties which moderate heat energy conducted therethrough over time. A thermally-responsive member movably disposed in the interior cavity formed of a shape memory material has a phase transition temperature range encompassing at least the preferred storage temperature range and has a first shape at temperatures below the phase transition temperature range and gradually changes to a second shape at temperatures within or above the preferred storage temperature range. An indicator visible through the window portion is moved by the thermally responsive member from an initial position as it gradually changes from its first shape to its second shape. The thermal capacity and insulative properties of the housing material and shape memory material phase transition temperature range are calibrated relative to one another to function in mutual cooperation such that the housing moderates heat energy conducted therethrough over time and the thermally-responsive member absorbs the heat energy and gradually assumes its second shape upon absorption of heat energy over time to closely match the known thermal deterioration characteristics of the perishable product. The indicator remains substantially in a position at which it was last moved by the thermally-responsive member, regardless of subsequent exposures of the shape memory material to lower temperatures, to indicate the cumulative amount of heat energy absorbed in and above the preferred storage temperature range and whether, at any time, the temperature has been above the preferred temperature range for a period of time sufficient to cause any degree of deterioration based on the time and temperature thermal deterioration profile of the perishable product.

SUMMARY OF THE INVENTION

It is therefore an object of the present invention to provide a cumulative thermal exposure monitor that is calibrated to respond to the absorption of thermal energy over time in manner that closely matches the time and temperature thermal deterioration profile of a particular perishable product being monitored.

It is another object of this invention to provide a cumulative thermal exposure monitor that monitors and indicates whether a product or container with which it is associated has absorbed an amount of heat energy within and above a preferred storage temperature range for a period of time that would be detrimental to the product.

Another object of this invention is to provide a cumulative thermal exposure monitor that can be used with perishable food products and non-food products such as medical products, drugs, research reagents, pharmaceuticals, human organs and tissues, product packaging, etc., to indicate whether, at any time in the chain of distribution from the source to the destination, the cumulative heat energy absorbed by such products has taken place for a period of time sufficient to cause a degree of deterioration based on the time and temperature thermal deterioration profile of the perishable product.

Another object of this invention is to provide a cumulative thermal exposure monitor that can be used with perishable food products that will accurately indicate the degree of spoilage or deterioration.

Another object of this invention is to provide a cumulative thermal exposure monitor that is capable of functioning in a wide range of threshold temperatures of from about −150° C. to about 250° C.

Another object of this invention is to provide a cumulative thermal exposure monitor that can be sterilized by chemicals, ionizing radiation or heat.

Another object of this invention is to provide a cumulative thermal exposure monitor that has a latching means that allows it to be handled at elevated temperature and in a practical fashion before use.

Another object of this invention is to provide a cumulative thermal exposure monitor that can serve as an inexpensive, convenient and effective regulatory tool for HACCP programs and allow real time decisions to be made as to the safety or quality of a perishable product.

Another object of this invention is to provide a cumulative thermal exposure monitor that may reduce liability by indicating, package by package, whether the thermal history of a particular perishable product was within proper limits while it was in transit or storage.

A further object of this invention is to provide a cumulative thermal exposure monitor that is food-safe and has little danger of contaminating the product it is monitoring.

A still further object of this invention is to provide a cumulative thermal exposure monitor that is inexpensive to manufacture, may be disposable, and is economical to install on individual containers.

Other objects of the invention will become apparent from time to time throughout the specification and claims as hereinafter related.

The above noted objects and other objects of the invention are accomplished by a cumulative thermal exposure monitor for monitoring heat energy absorbed over time and indicating the degree of deterioration based on a time and temperature thermal deterioration profile of a perishable product that has a known time and temperature thermal deterioration profile and is prescribed to be maintained within a preferred storage temperature range. The device has a thermally-conductive housing with a fluid sealed interior cavity and a transparent window portion, the housing formed of a material having thermal capacity and insulative properties which moderate heat energy conducted therethrough over time. A thermally-responsive member movably disposed in the interior cavity formed of a shape memory material has a phase transition temperature range encompassing at least the preferred storage temperature range and has a first shape at temperatures below the phase transition temperature range and gradually changes to a second shape at temperatures in and above the preferred storage temperature range. An indicator visible through the window portion is moved by the thermally responsive member from an initial position as it gradually changes from its first shape to its second shape. The thermal capacity and insulative properties of the housing material and shape memory material phase transition temperature range are calibrated relative to one another to function in mutual cooperation such that the housing moderates heat energy conducted therethrough over time and the thermally-responsive member absorbs the heat energy and gradually assumes its second shape upon absorption of heat energy over time to closely match the known thermal deterioration profile of the perishable product. The indicator remains substantially in a position at which it was last moved by the thermally-responsive member, regardless of subsequent exposures of the shape memory material to lower temperatures, to indicate the cumulative amount of heat energy absorbed within and above the preferred storage temperature range and whether, at any time, the temperature has been above the preferred temperature range for a period of time sufficient to cause any degree of deterioration based on the time and temperature thermal deterioration profile of the perishable product.

BRIEF DESCRIPTION OF THE DRAWINGS

FIGS. 9A and 9B are enlarged longitudinal cross section views of a tubular embodiment of the disposable cumulative thermal exposure monitor utilizing a single coiled spring formed of shape memory material.

DESCRIPTION OF THE PREFERRED EMBODIMENTS

Figure 1:
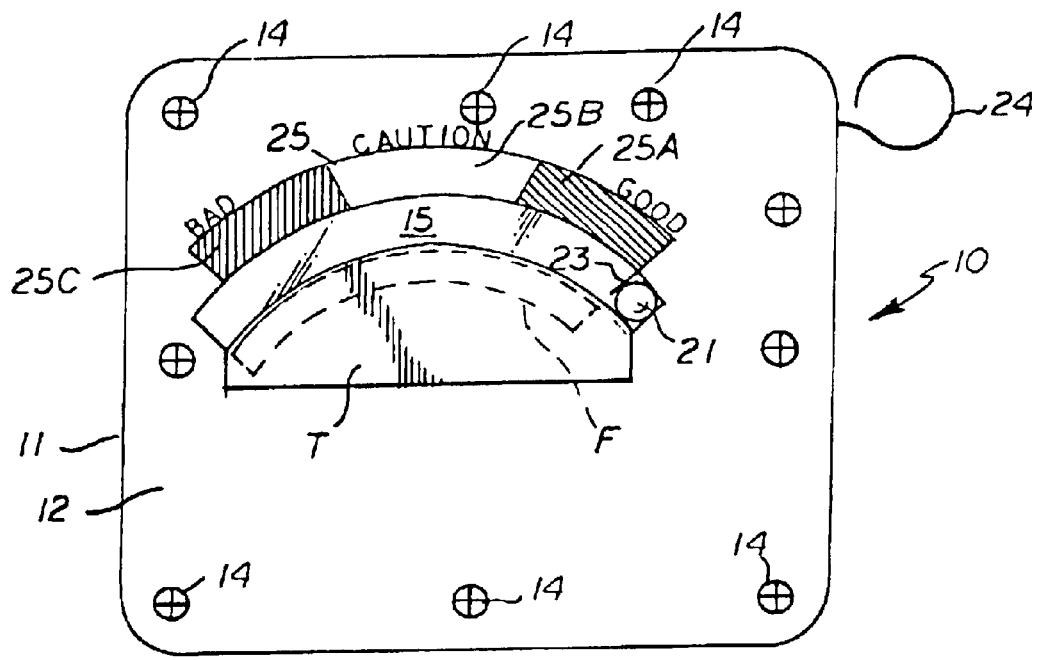
FIG. 1 is an enlarged front view of the face of a preferred single-use disposable embodiment of the cumulative thermal exposure monitor in accordance with the present invention.

The present invention utilizes the unique phase transition properties (shape memory and superelasticity) of shape memory materials such as "Shape Memory Alloys" (SMA) and "Shape Memory Polymers" (SMP). Shape memory alloys undergo a reversible phase transition in their crystal structure when heated from a low temperature form to a high temperature form. Upon heating or cooling, shape memory alloys do not completely undergo their phase transition at one particular temperature. Instead, the transition begins at one temperature (known as the start temperature) and is completed at another temperature (known as the finish temperature). Further, there is a difference in the transition temperatures upon heating from the first phase to the second phase (martensite to austenite for example in Ni—Ti) and cooling from the second phase to the first (austenite to martensite), resulting in a delay or "lag" in the transition. This difference is known as the transition temperature hysteresis. The transition temperature hysteresis can also be effected by alloying, cold working and heat treatment.

The terms used in the following discussion are meant to have the following meanings. The "austenitic start temperature" ($A_s$) is the temperature at which a shape memory alloy starts transforming to austenite upon heating. The "austenitic finish temperature" ($A_f$) is the temperature at which a shape memory alloy finishes transforming to austenite upon heating. "Austenite" is the higher temperature phase present in Ni—Ti, for example. The "martensitic start temperature" ($M_s$) is the temperature at which a shape memory alloy starts transforming to martensite upon cooling. The "martensitic finish temperature" ($M_f$) is the temperature at which a shape memory alloy finishes transforming to martensite upon cooling. "Martensite" is the more deformable, lower temperature phase present in Ni—Ti, for example. "Hysteresis" is the temperature difference between a phase transition upon heating and cooling. "Shape memory" is the ability of certain materials to return to a predetermined shape upon heating via a phase transition. "Superelasticity" is the springy, "elastic" behavior present in shape memory alloys, such as Ni—Ti, at temperatures just above the $A_f$ temperature. The superelasticity arises from the formation and reversion of stress-induced martensite. Phase transition temperatures of the metal alloys can be accurately set between −200° C. to 250° C. by varying the composition of the alloy and annealing procedure when forming the shape memory alloy wire.

"Shape Memory Polymer" (SMP) or polymer composites work similarly to existing shape memory alloys (SMA). The SMP material, commonly composed of oligo-dimethacrylate and n-butyl acrylate, undergoes a phase transition at a transition temperature range encompassing the glass transition temperature Tg, whereby heating the material above the temperature Tg enables the material to soften and be reshaped to another configuration, and cooling of the material below the temperature Tg causes the material to stiffen and retain the reshaped configuration until the material is reheated to above the temperature Tg causing the material to return to its original shape. SMPs are generally characterized as phase segregated linear block co-polymers having a hard segment and a soft segment. The hard segment is typically crystalline, with a defined melting point, and the soft segment is typically amorphous, with a defined glass transition temperature Tg. In some embodiments, however, the hard segment is amorphous and has a glass transition temperature rather than a melting point. In other embodiments, the soft segment is crystalline and has a melting point rather than a glass transition temperature. The melting point or glass transition temperature of the soft segment is substantially less than the melting point or glass transition temperature of the hard segment. Examples of polymers used to prepare hard and soft segments of SMPs include various polyethers, polyacrylates, polyamides, polysiloxanes, polyurethanes, polyether amides, polyurethane/ureas, polyether esters, and urethane/butadiene copolymers. Recently SMPs have been developed that a capable of holding more than one temporary shape in memory. For a more detailed description of shape memory polymers, the reader is referred to U.S. Pat. Nos. 6,160,084 and 6,388,043 issued to Langer et al, which are hereby incorporated by reference to the same extent as if fully set forth herein.

Suitable shape memory materials include Ag—Cd, Au—Cd, Cu—Al—Ni, Cu—Sn, In—Ti, Ni—Al, Ni—Ti, Fe—Mn—Si, Cu—Zn—Al, Ni—Ti—Fe, Ni—Ti—Cu, Ni—Ti—Pd, Nb—Ru, Ta—Ru, Ti—Ni—Hf, Fe—Mn—Si, Cu—Zn—Si, Cu—Zn—Sn, Fe—Pt, Mn—Cu, polyurethanes, epoxies, oligo-dimethacrylate and n-butyl acrylate, Pb—La—Zr—Sn—Ti, Pb—Y—Zr—Sn—Ti—O, Pb—Ba—Zr—Ti—O and U—Nb.

As used herein, "product" is the thing or medium that is being monitored and may include food products, non-food products, medical products, drugs, research reagents, pharmaceuticals, human organs, tissues, or other substance or device that may be subject to deterioration upon exposure to thermal differences over time, or the product package. "Threshold temperature" is the temperature at which deterioration of a product begins or substantially increases based on a time and temperature thermal deterioration profile of that particular product. "Thermal capacity" is defined as the product of specific heat, volume and density of the housing and shape memory material. "Heat energy" is a function of time and temperature difference.

As used herein, the term "phase transition start temperature" means the temperature at which the shape memory material (SMA or SMP) is set to begin to change from its first shape. "Phase transition finish temperature" means the temperature at which the shape memory material is set to assume its second shape. "Phase transition temperature range" means the temperature range over which the shape memory material changes from its first shape to its second shape. "Preferred storage temperature range" is a known practical temperature range within which a product must be maintained to minimize deterioration. The shape memory "phase transition temperature range" would encompass at least the "preferred storage temperature range" of the product being monitored. The "time and temperature thermal deterioration profile" is the unique relationship between a product's deterioration and absorbed thermal energy as a result of time and temperature at temperatures inside and encompassing the product's "preferred storage temperature range".

An important feature of the present invention is that the thermal capacity and insulative properties of the housing material and shape memory material phase transition temperature range are calibrated relative to one another to function in mutual cooperation such that the housing moderates heat energy conducted therethrough over time and the thermally-responsive member absorbs the heat energy and gradually assumes its second shape upon absorption of heat energy over time to closely match or mimic the time and temperature thermal deterioration profile of the perishable product.

Figure 2:
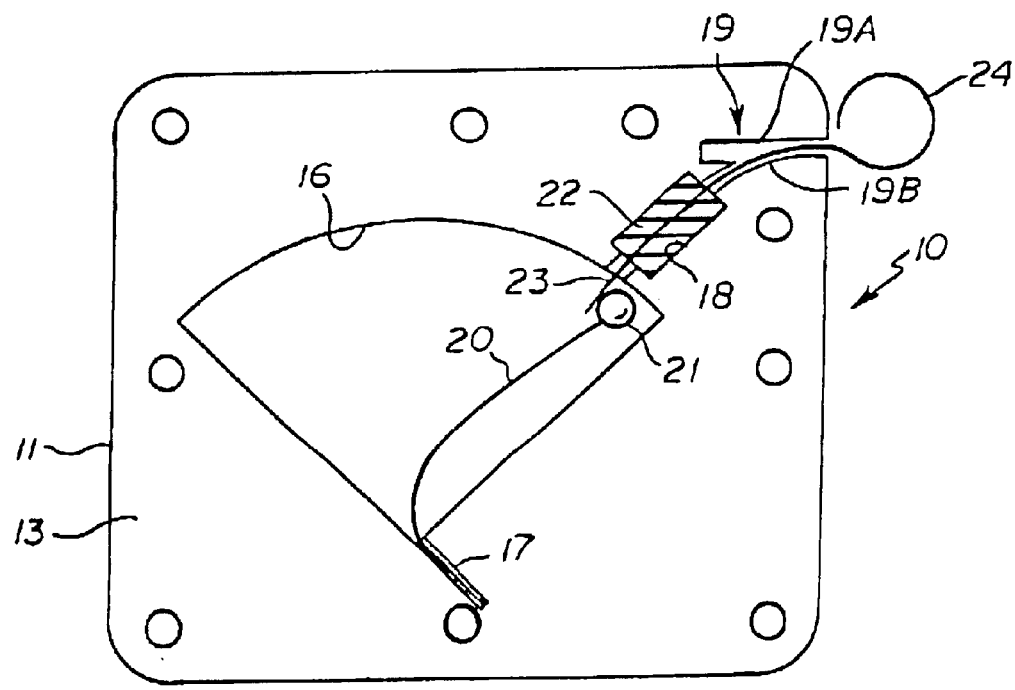
FIG. 2 is an enlarged front view of the single-use disposable embodiment of FIG. 1 with the faceplate removed.

Referring now to the drawings by numerals of reference, there is shown in FIGS. 1 and 2, a preferred single-use, non-resettable or disposable embodiment of the cumulative thermal exposure monitor 10 in accordance with the present invention. The monitor 10 has a generally rectangular outer housing 11 which, in a preferred embodiment, is formed of a faceplate 12 and a back plate 13 secured together such as by screws 14, adhesives, or other conventional fastening means. The faceplate 12 and back plate 13 are formed of a rigid plastic or composite material that moderates heat conduction and, preferably, is capable of being sterilized by chemicals, heat or ionizing radiation. The faceplate 12 has a clear arcuate window portion 15. Although the housing is shown for purposes of illustration as being rectangular, it should be understood that the housing may be circular or various other configurations.

The front surface of the back plate 13 has a pie-shaped recess or cavity 16 with a small slot 17 extending a short distance outwardly from the apex of the pie-shape. An upper recess 18 extends outwardly from the curved portion of the pie-shaped cavity 16 near one side. A generally Y-shaped recess 19 formed in the back plate has a first leg 19A extending inwardly from one the side and a second leg 19B that curves downwardly from the first leg and adjoins the upper recess 18.

A stiff thin rectangular strip or wire of shape memory alloy (SMA) or shape memory polymer (SMP) material 20 having a straight remembered configuration has one end secured in the slot 17 at the apex of the pie-shaped cavity 16 and has an enlarged colored indicator or marker 21, such as a bead, at its opposed free end. A self-sealing synthetic rubber or elastomeric seal 22 is disposed in the upper recess 18. One end of a thin stiff wire latch pin 23 extends through the seal 22 and its opposed end 24 remains outside of the outer housing 11.

The material(s), thickness and thermally insulative properties of the outer housing plates 12 and 13 are selected to provide a desired thermal capacity (the product of specific heat, volume and density) and the shape memory material phase transition temperature range are calibrated relative to one another to function in mutual cooperation such that the housing moderates heat energy conducted therethrough over time and the thermally-responsive member absorbs the heat energy and gradually assumes its second shape upon absorption of heat energy over time to closely match or mimic the time and temperature thermal deterioration profile (described hereinafter) of the perishable product for which the device is to be used.

As seen in FIG. 2, in the inactive position, the free end of the shape memory strip or wire 20 is biased toward one side of the pie-shaped cavity 16 and the inward facing end of the latch pin 23 extends downwardly into the pie-shaped cavity to engage the free end of the wire or marker 21 and hold it in its curved biased position. With the shape memory strip or wire 20 in the inactive latched position, the pie-shaped cavity 16 is filled with a fluid such as propylene glycol or a gas, or the gas is partially removed to create a partial vacuum, and the faceplate 12 and back plate 13 are sealed together to provide a fluid tight unit. To activate the device, the pin 23 is pulled completely out of the seal 22 and outer housing 11 to allow the shape memory strip or wire 20 to change from its initial shape to its remembered straight shape upon absorbing heat while in its phase transition temperature range. The fluid or partial vacuum in the cavity is also selected and to provide a desired thermal capacity and insulative properties that moderate heat energy conducted therethrough over time and is calibrated to function in mutual cooperation with the thermal capacity and insulative properties of the housing material and the shape memory phase transition temperature range to closely match or mimic the time and temperature thermal deterioration characteristics (described below) of the perishable product.

An adhesive material (not shown) may be applied to the back surface of the back plate 13 of the outer housing 11 for attaching the housing to a product or food packaging material. A scale 25 is disposed on the front surface of the faceplate 12 above the arcuate window 15. The scale 25 is provided with calibrations 25A, 25B, 25C that relate the deflection of the shape memory strip or wire 20, or the position of the marker 21, to the degree of spoilage or deterioration of the particular product being monitored. Cumulative thermal exposure monitors may be provided in a wide variety of models to monitor different perishable products.

Figure 12:
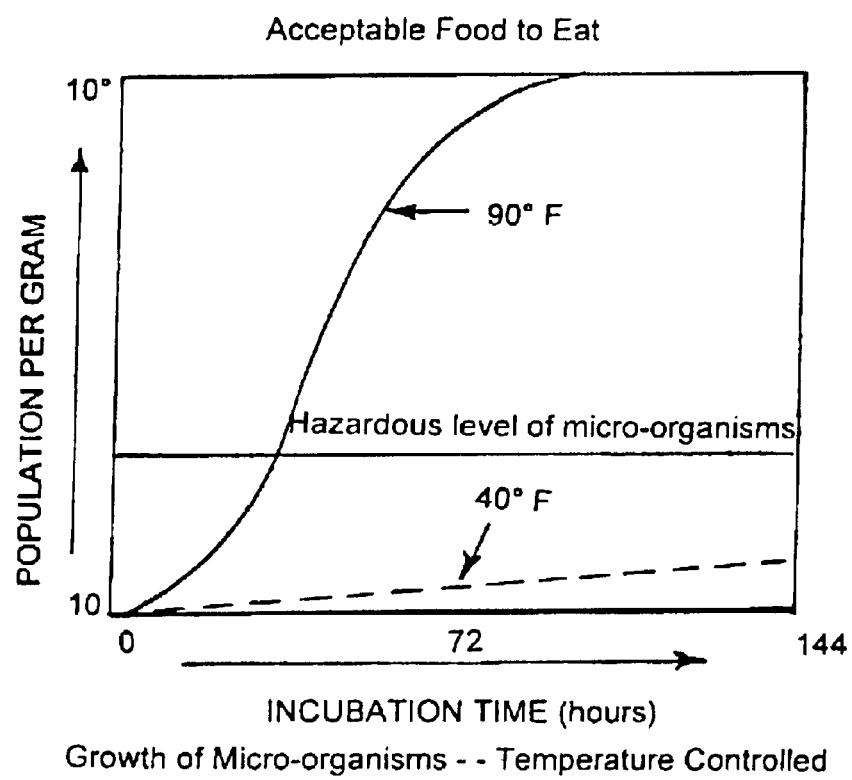
FIG. 12 is an example of a chart illustrating a time-temperature-deterioration curve of a perishable food product that may be utilized to design and calibrate the components of a cumulative thermal exposure monitor having a response that closely matches the time and temperature thermal deterioration profile of the perishable product.

To achieve the desired thermodynamic properties, "time and temperature thermal deterioration curves" such as shown in FIG. 12 may be used to develop a time and temperature thermal deterioration profile based on historical data on the extent or degree of deterioration with respect to time and temperature for the particular product for which the device is to be used. In the example of FIG. 12, the deterioration due to microbial growth caused by prolonged exposure to elevated temperature is shown. The thermal capacity and thermal insulative properties of the housing, the phase transition temperature range of the shape memory member, and the cavity fluid, can be calibrated to function in mutual cooperation with each other to closely respond in accordance with the curve to measure the total heat energy absorbed above the threshold temperature (temperature at which deterioration of the particular product begins or significantly increases). Regardless of how many times the cumulative thermal exposure monitor may have been put into and taken out of a freezer, the indicator would show the cumulative heat energy absorbed at temperatures above the threshold temperature.

HACCP guidelines from the United States government Food and Drug Administration as well as other agencies of the US government and agencies of other governments may be used to develop the thermal decay profiles or time and temperature thermal deterioration profiles for the cumulative thermal exposure monitors. Other sources may be used as is appropriate for the type of product, medium, drug, or other substance or device to be monitored.

As an example, a monitor can be made for monitoring a food product wherein the meat is stored at a warehouse at −20° F., is shipped in a truck that is supposed to be maintained at 0° F., and must never be exposed to temperatures above 40° F. for more than a total of 4 hours prior to cooking and consumption. Thus, the prescribed preferred storage temperature range for the product would be from −20° F. to 40° F. and the prescribed time period would be 4 hours. The thermal capacity and insulative properties of the housing, the cavity fluid, and the phase transition temperature range of the shape memory member would calibrated to function in mutual cooperation with each other such that the shape member has a first shape at temperatures below −20° F. and gradually changes to its second shape upon absorption of heat exceeding 40° F. for 4 hours.

The shape memory member 20 with the marker 21 on its outer end will deflect from "GOOD" (25A) to "BAD" (25C) at a rate dependent upon the total heat energy that is absorbed into the device. In the event that the temperature should drop below the phase transition temperature range while the device was responding, the shape memory member 20 or marker 21 would remain in the position it last attained.

When the marker 21 is in the "GOOD" section (25A), it indicates that the temperature is and, since the device was activated, has been within the acceptable limits (below 40° F. in the example); when the marker is in the "CAUTION"

section (25B), it indicates that the threshold temperature (40° F.) has been exceeded, but not for a sufficient period of time that would be detrimental; and when it is in the "BAD" section (25C), it indicates that the temperature has exceeded the threshold temperature (40° F.) for a sufficient amount of time to cause a significant degree of deterioration.

Thus, upon arrival or departure at an inspection point in the distribution chain, one could quickly and easily determine whether the food or product is presently, or has previously been, exposed to temperatures exceeding the threshold temperature and/or for a sufficient amount of time to cause significant deterioration of the product.

Figure 3:
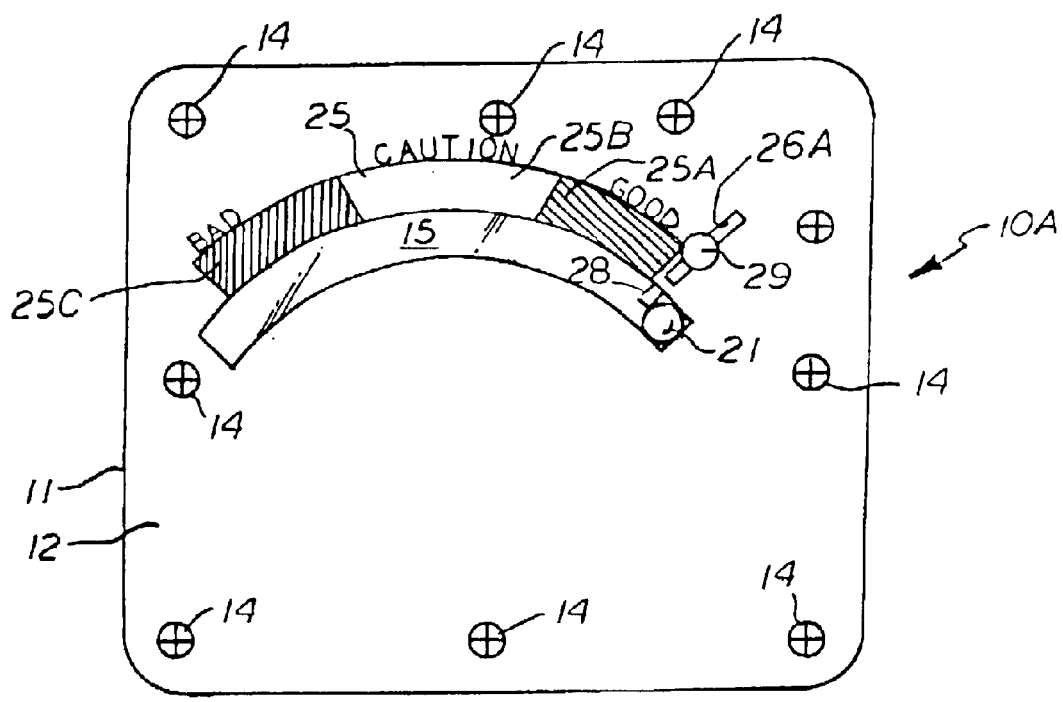
FIG. 3 is an enlarged front view of the face of a modification of the disposable cumulative thermal exposure monitor of FIGS. 1 and 2, having a different latch pin arrangement.
Figure 4:
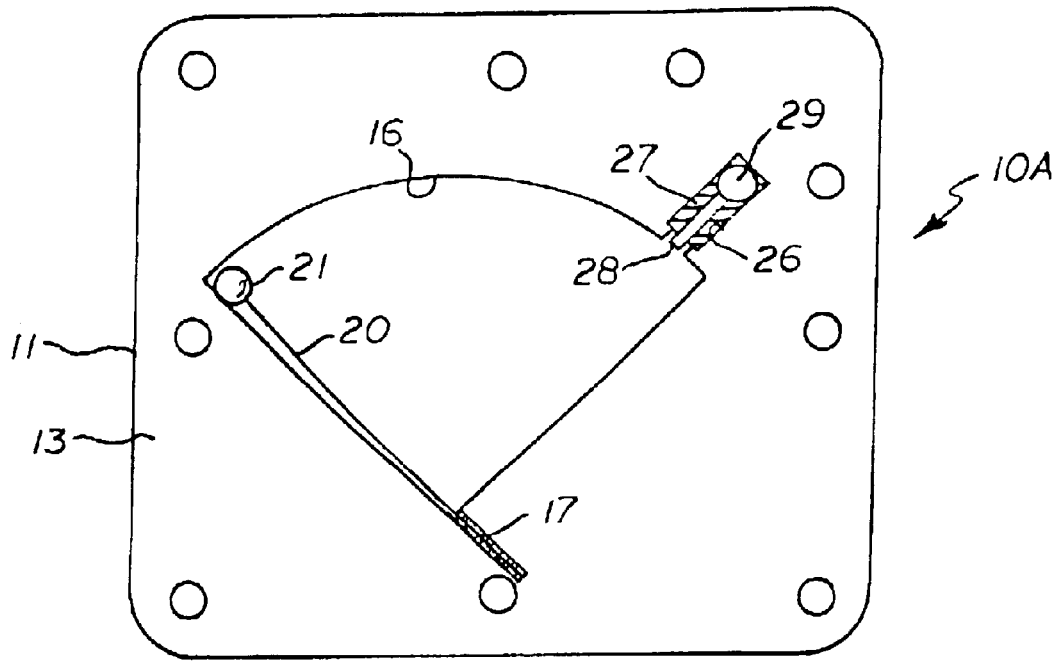
FIG. 4 is an enlarged front view of the embodiment of FIG. 3 with the faceplate removed and the latch pin retracted.

FIGS. 3 and 4 show a modification of the disposable cumulative thermal exposure monitor 10A having a different latch pin arrangement. In FIGS. 3 and 4, the same numerals of reference are used to identify the components previously described, but the detailed description of the components will not be repeated to avoid repetition. In this modification, the previously described Y-shaped recess 19 is replaced with a straight slot 26 formed in the back plate 13 that extends a short distance angularly outwardly from the curved portion of the pie-shaped cavity 16 toward a corner of the back plate. A synthetic rubber or elastomeric seal 27 having a central bore is disposed in the lower end of the slot 26.

One end of a thin stiff latch pin 28 extends through the bore of the seal 27 and its opposed end has a small bead or protuberance 29 that extends upwardly through a narrow rectangular aperture 26A in the faceplate 12 for sliding the pin 28 in and out relative to the pie-shaped cavity 16. In the inactive position, the free end of the shape memory strip or wire 20 is biased toward one side of the pie-shaped cavity 16 and the inner facing end of the latch pin 28 extends downwardly into the pie-shaped cavity to engage the free end of the shape memory member or marker 21 to hold it in its curved biased position. To activate the device, the pin 28 is retracted to allow the shape memory strip or wire 20 to change from its initial shape to its remembered straight shape. FIG. 4 shows the pin 28 retracted and the shape memory strip or wire 20 in an indicating position after the device has been affixed to the food or product and given time to cool down or cold soak.

Figure 5:
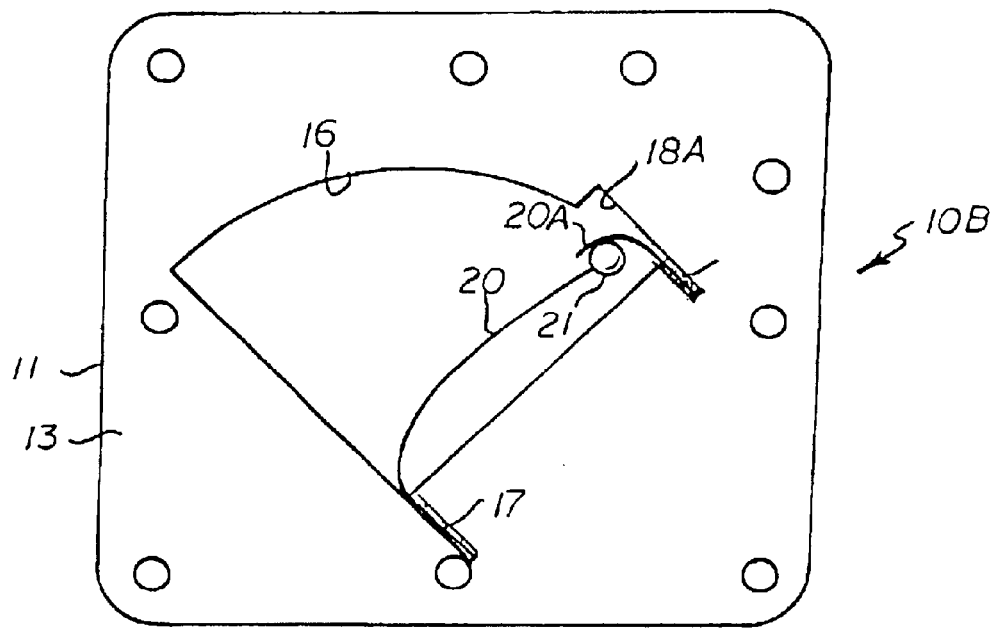
FIGS. 5 and 5A are enlarged front views of another modification of the disposable cumulative thermal exposure monitor with the faceplate removed having a shape memory latch pin arrangement, showing it in the latched and unlatched positions, respectively.
Figure 5A:
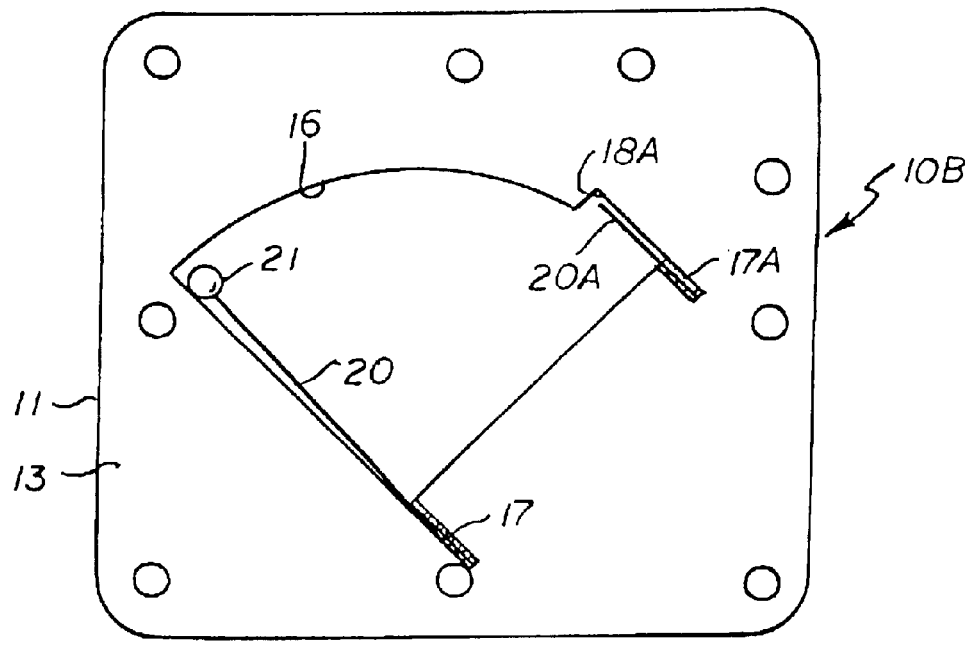

FIGS. 5 and 5A show another modification of the cumulative thermal exposure monitor 10B having a shape memory latch pin arrangement. In FIGS. 5 and 5A, the same numerals of reference are used to identify the components previously described, but the detailed description of the components will not be repeated to avoid repetition. In this modification, a second small slot 17A extends a short distance laterally outwardly from the curved portion of the pie-shaped cavity 16 and a rectangular recess 18A extends upwardly from the curved portion at one side adjacent to the slot 17A. A second stiff thin rectangular strip or wire 20A formed of shape memory alloy (SMA) or shape memory polymer (SMP) material having an initial curved remembered configuration has one end secured in the slot 17A and serves as the latch member. As shown in FIG. 5, in its curved configuration, the latch member 20A is engaged with the enlarged colored bead or marker 21 at the top end of the first wire 20 to hold it in its curved biased position. As shown in FIG. 5A, the shape memory latch member 20A will, upon losing heat energy, drop below its phase transition start temperature, change to a straight configuration (on its own or with the force exerted on it by the first shape memory strip or wire 20 in its effort to return to its remembered form), and will become disengaged from the bead or marker 21 to allow the first shape memory strip or wire 20 to change from its initial curved shape to its remembered straight shape.

In the embodiments of FIGS. 1–5, the scale 25 is divided into three different colored sections and/or indicia that visually the represent the degree of deterioration of the product based on the time and temperature thermal deterioration characteristics (thermal decay profile) of the particular product to be monitored, i.e., "GOOD", "CAUTION" and "BAD", with the "GOOD" section representing the state that the monitor 10, 10A or 10B was in at the time it was affixed to the product and the product was cooled and has been maintained at the proper temperature. After the monitor 10, 10A, or 10B is affixed to the product, package or container, and the goods have reached the desired temperature, the latch pin 23 is pulled out of the housing 11 or, in the embodiment of FIGS. 3 and 4, the pin 28 is retracted. In the embodiment of FIGS. 5 and 5A, the latch member 20A is disengaged upon it dropping below its phase transition start temperature.

The present invention may also utilize a magnetic field to induce an electric current in the shape memory latch member, which in turn causes the latch member to heat and assume its remembered shape to release the shape memory strip or wire 20 or marker 21. The present invention may also utilize a magnetic latch means comprising a ferromagnetic metal portion that restrains the indicating member and a magnetic activator means that will cause the magnetic latch portion to move thus releasing the indicating member, when in the presence of the activator.

Referring again to FIGS. 1 and 2, there is shown another modification of the cumulative thermal exposure monitor that may also have any of the previously described latching options. In this embodiment, radioactive material is incorporated into the shape memory element 20 and/or the bead or marker 21, and a piece of film material F (indicated in dashed line) is affixed to the underside of the faceplate 12 beneath the window 15. The film material F is an optically stimulated luminescence material, thermo-luminescence material or photochromic material (which includes radiochromic materials and others). The film F is disposed in close proximity to the shape memory element 20 and the marker 21. A piece of opaque tape T is affixed to the front surface (top side) of the faceplate 12 in superposed relation to the film F on the underside of the faceplate. For films that are sensitive to ambient light, additional light protective coatings may be applied to the film, or the housing may be configured to isolate the film from ambient light.

When the monitor is in the unlatched condition and the shape memory element 20 and marker 21 start their arcuate path across the device, the film F will be altered by exposure to the radiation emitted by the radioactive material with respect to time and location of the shape memory element 20 or marker 21. For example, a radiochromic film will darken when exposed to radiation and become darker the longer it is exposed. After the product on which the monitor is affixed has arrived at its destination, the film F can be evaluated to derive a precise time and temperature log of environmental thermal events by utilizing means well known for radiation dosimetry and knowledge of the response characteristics of the shape memory material.

Figure 6:
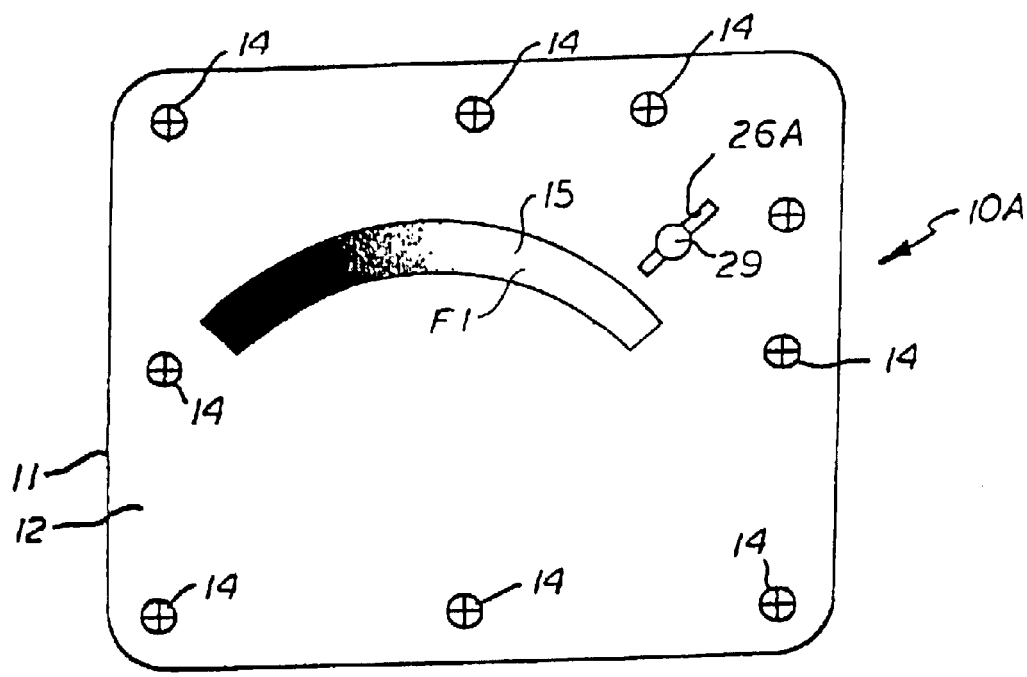
FIG. 6 is an enlarged front view of another embodiment of the cumulative thermal exposure monitor having a magnetically activated display.

Referring again to FIGS. 1, 2 and additionally to FIG. 6, there is shown another modification similar to that just described that may also have any of the previously described latching options. In this modification, magnetic material is incorporated into the shape memory element 20 and/or the bead or marker 21, and a piece of film material F1 is affixed to the underside of the window 15 of the faceplate 12 behind the window 15. The film material F1 contains one or more types of magnetic or paramagnetic particles of chosen darker colors and a distributed non-magnetic white or lighter colored pigment encapsulated in a viscous support medium. The side of the film adjacent the window is transparent and the side closest to the shape memory member 20 or the bead or marker 21 has a layer of filter material in intimate contact with the support media to trap particles. When the device is unlatched and the shape memory member 20 or marker 21 containing magnetic material moves near a portion of the film, the magnetic and paramagnetic particles will be attracted at a rate in accordance to their size, shape, and magnetic susceptibility and the viscosity of the support media to alter the film and produce a visible gradient of colors or shades in the film with respect to time and location of the shape memory element 20 or marker 21. In other words, the film will appear to lighten and/or change color and become lighter the longer it is exposed. By evaluating the observable gradient of colored particle concentrations in the film compared to a standard, a precise time and temperature log of environmental thermal events may be derived.

FIGS. 7A through 7D illustrate another embodiment of the disposable cumulative thermal exposure monitor 30. The monitor 30 has a generally rectangular housing 31 which, in a preferred embodiment, is formed of a faceplate 32 and a back plate 33 secured together. As with the previous embodiments, the faceplate 32 and back plate 33 of the housing 31 are formed of a rigid plastic or composite material that moderates heat energy conducted therethrough and may be capable of being sterilized by chemicals, heat or ionizing radiation. It should be understood that the housing may be circular or various other configurations. An adhesive material (not shown) may also be applied to the back surface of the back plate of the outer housing for attaching the housing to a product or food packaging material. The faceplate 32 has a clear rectangular window portion 34 and a scale 35 laterally adjacent to the window. The scale 35 is divided into three different colored sections and/or indicia that visually represent the degree of spoilage or deterioration of the particular product being monitored, i.e., "GOOD", "CAUTION" and "BAD", with the "GOOD" section being lowermost section and representing the state that the monitor 30 was in at the time it was affixed to the food or product and the food or product was cooled to the proper temperature or cold soaked.

The front surface of the back plate 33 has a generally bell-shaped cavity 36 with a cylindrical or rectangular upper portion 37. A channel or slot 38 extends transversely across the upper portion 37 and laterally to one side thereof. A thin stiff latch pin 39 slidably disposed in the slot 38 extends across the upper portion 37 of the bell-shaped cavity 36 and has a small bead or protuberance 40 at its outer end that extends upwardly through a narrow rectangular slot 38A in the faceplate 32 for sliding the pin 39 laterally in and out relative to the upper portion 37. A synthetic rubber or elastomeric seal (not shown) having a central bore may be disposed at the inward facing end of the slot 38 with the inward facing end of the latch pin 39 extending through the seal.

In this embodiment, a stiff thin rectangular strip or wire 41 of shape memory alloy (SMA) or shape memory polymer (SMP) material having an narrow inverted generally V-shaped (parabolic) remembered configuration (FIG. 7D) is disposed in the bell-shaped cavity 36 with its raised midsection (apex) at the lower end of the upper portion 37. In the remembered configuration, the apex angle of the strip or wire 41 is about 30°. A colored rectangular member or fluted disk 42 is slidably disposed in the cylindrical upper portion 37 of the bell-shaped cavity 36. The rectangular member or disk 42 is sized to frictionally engage the interior of the cylindrical upper portion 37 with sufficient force to prevent it from sliding due to gravity but allow it to slide under the force of the shape memory strip or wire 41.

Figure 7A:
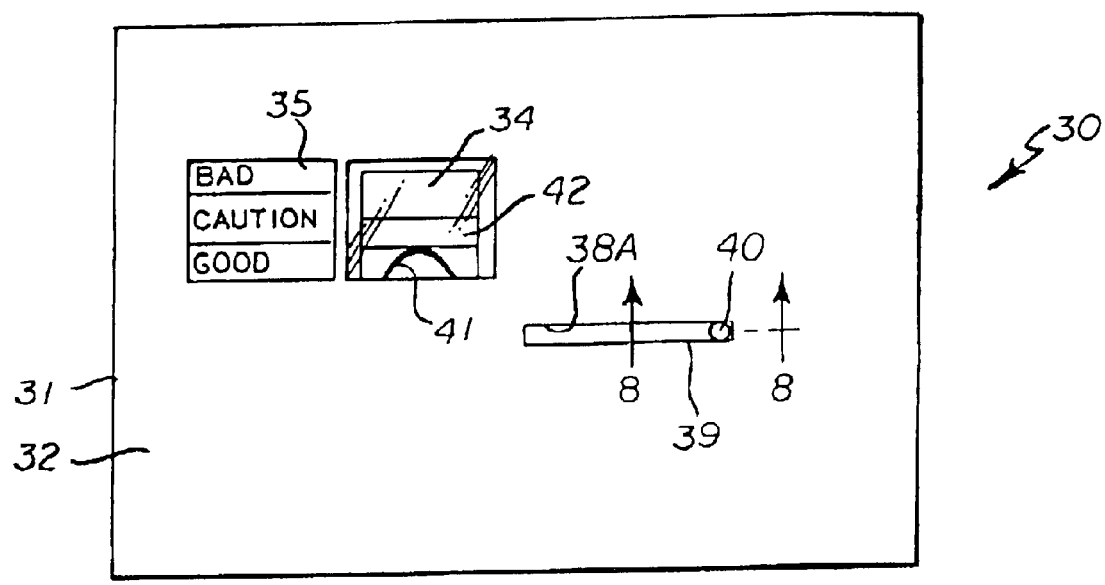
FIGS. 7B, 7C, and 7D are enlarged front views of the embodiment of FIG. 7A with the faceplate removed, and showing the indicator in various positions.
Figure 7B:
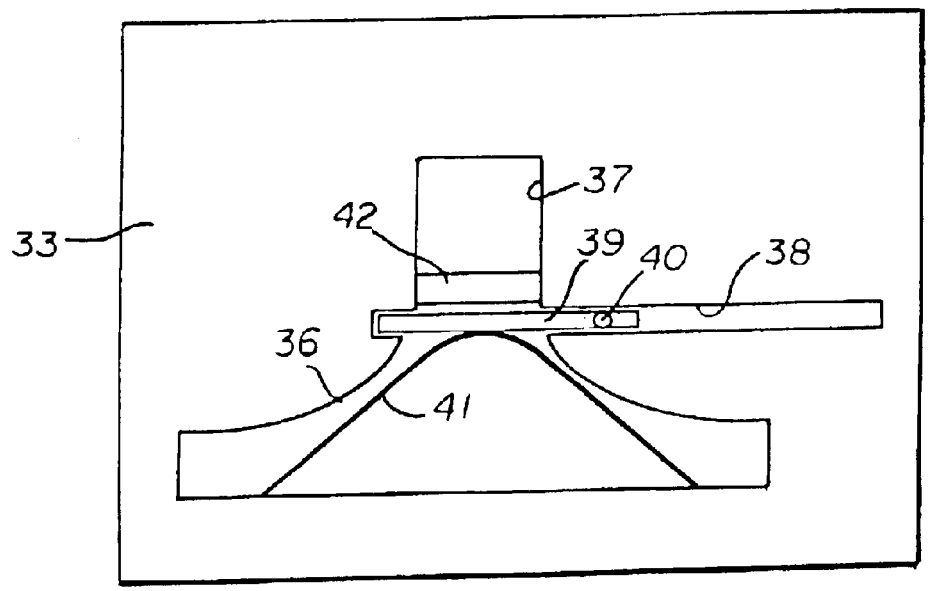

As seen in FIG. 7B, in the inactive latched position, the rectangular member or fluted disk 41 rests on the top surface of the latch pin 39, and the raised midsection (apex) of the shape memory member 41 is biased downwardly and held in placed by the latch pin 39. In the downwardly biased configuration, the apex angle of the strip or wire 41 is about 60°. With the shape memory strip or wire 41 in the inactive position, the bell-shaped cavity 36 and cylindrical upper portion 37 are filled with a fluid such as propylene glycol or a gas, or the gas is removed to create a partial vacuum, and the faceplate 32 and back plate 33 are sealed together to provide a fluid tight unit.

As with the previous embodiments the material(s), thickness and thermally insulative properties of the housing plates are selected to provide a desired thermal capacity (the product of specific heat, volume and density), the shape memory material phase transition temperature range, and the fluid or partial vacuum in the cavity are calibrated relative to one another to function in mutual cooperation such that the housing moderates heat energy conducted therethrough over time and the shape memory strip or wire absorbs the heat energy and gradually assumes its second shape upon absorption of heat energy over time to closely match or mimic the time and temperature thermal deterioration profile of the product for which the device is to be used.

Figure 7C:
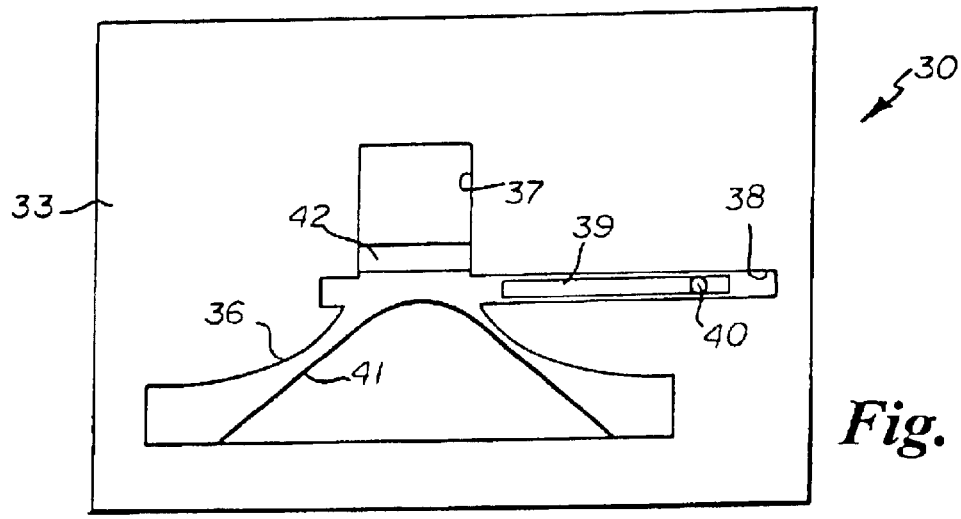
Figure 7D:
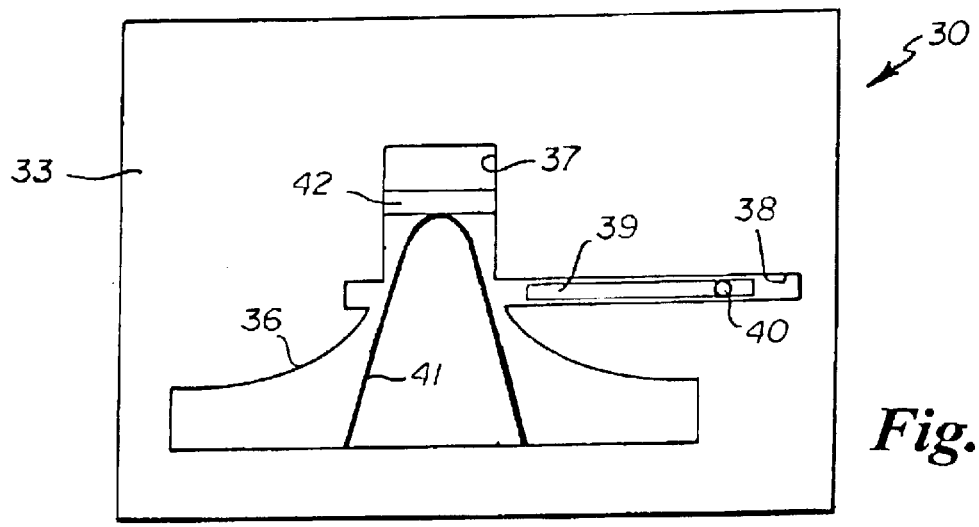
Figure 8:
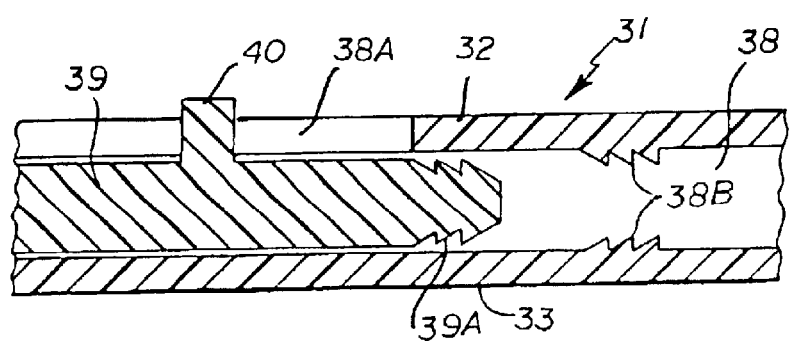
FIG. 8 is a greatly enlarged view of the latch pin of the embodiment of FIG. 7A showing the details of the latch pin locking arrangement.

To activate the device, after it has been affixed to the food or product and given time to cool down, the pin 39 is retracted laterally to allow the shape memory strip or wire 41 to change to its remembered configuration which then engages the rectangular member or disk 42 to move it upwardly in the upper portion 37. As shown in greater detail in FIG. 8, the outer end of the slot 38 is provided with a series of protuberances 38B that engage mating protuberances 39A on the latch pin 39 to lock the pin in the retracted position. FIG. 7C shows the monitor in the active position with the latch pin 39 in the retracted position and the shape memory strip or wire 41 in a position after the device has been affixed to the food or product, and given time to cool down or cold soak. FIG. 7D shows the monitor 30 in the active position with the shape memory strip or wire 41 and rectangular member or fluted disk 42 in a position indicating that the environment surrounding the food or product to which the monitor is attached has exceeded the threshold temperature (the temperature at which deterioration begins or significantly increases), and has stayed above that temperature long enough to cause a significant degree of deterioration. As the shape memory strip or wire 41 exceeds its phase transition start temperature it begins to return to it's remembered state and its apex angle decreases thereby forcing the fluted disk 42 upwardly in the upper portion 37. The rectangular member or fluted disk 42 remains wedged in the upper portion 37 at the highest point at which the shape memory strip or wire 41 was able to expand.

The following is an example of how the embodiments of FIGS. 1–5 or 7A may be used. A meat wholesaler ships large volumes of ground beef via an independent trucking company. The ground beef is packaged in boxes each weighing 40 pounds. A typical shipment consists of 50 boxes (2000 lbs.). The shipments are typically from the warehouse to a fast-food restaurant. Because the restaurants are busy and the delivery truck has to deliver to several restaurants, the boxes of meat are sometimes left on the loading dock for a time until the restaurant employees have time to rearrange the freezer and put the meat away. The meat is stored at the warehouse at −20° F. and is shipped in a truck that is supposed to be maintained at 0° F. According to the regulatory guidelines the meat must never be exposed to temperatures above 40° F. for more than a total of 4 hours prior to cooking and consumption.

Obviously, the boxes of meat sitting on the loading dock of the restaurant are exposed to ambient (room) temperature. If allowed to sit on the loading dock for a significant period of time the meat would spoil. However, a short stay on the loading dock does not endanger the freshness of the meat.

A disposable cumulative thermal exposure monitor 10, 10A, 10B or 30 attached to each box of meat before it is initially frozen at the wholesaler's warehouse (at the time the frozen meat is prepared for shipment the monitors would be unlatched or "armed") would indicate that during the whole transport process the meat was never subjected to a prolonged elevated temperature. In the event that during transport or storage the meat was exposed to a temperature above the selected threshold temperature and held above that temperature for a period long enough to cause significant deterioration, the indicator 21 or disk 42 of the monitor would be positioned corresponding to that degree of deterioration. At a glance an inspector or worker could determine if conditions existed where a dangerous degree of spoilage may have occurred during the entire transport process.

FIGS. 9A and 9B show a tubular embodiment of a disposable cumulative thermal exposure monitor 50. In this embodiment, the outer housing 51 is a tubular member enclosed at each end and filled with a fluid such as propylene glycol or a gas, or the gas is removed to create a partial vacuum. As with the previous embodiments, the housing is formed of a rigid plastic or composite material that moderates heat energy conducted therethrough and may be capable of being sterilized by chemicals, heat or ionizing radiation. An adhesive material (not shown) may also be applied to the exterior surface of the outer housing for attaching the housing to a product or food packaging material.

In this embodiment, a coiled spring 52 formed of shape memory alloy (SMA) or shape memory polymer (SMP) is disposed in the lower portion of the tubular housing 51. The spring 52 has a remembered expanded (increased length) configuration. A colored fluted disk 53 is slidably disposed inside the housing 51 above the spring 52. The disk 53 is sized to frictionally engage the interior side wall of the tubular housing 51 with sufficient force to prevent it from sliding due to gravity but allow it to slide under the force of the shape memory spring 52.

The exterior of the housing 51 is provided with three longitudinally spaced transparent sections 54A, 54B and 54C (represented by dashed lines) and/or lines or indicia that allow the position of the disk to be visually observed and represent the degree of spoilage or deterioration of the particular product being monitored, i.e., "GOOD", "CAUTION" and "BAD", with the "GOOD" section being lowermost section and representing the state that the monitor 50 was in at the time it was affixed to the food or product and the food or product was cooled to the proper temperature or cold soaked.

As with the previous embodiments the material, thickness and thermally insulative properties of the housing are selected to provide a desired thermal capacity (the product of specific heat, volume and density), the shape memory material phase transition temperature range, and the fluid or partial vacuum in the cavity are calibrated relative to one another to function in mutual cooperation such that the housing moderates heat energy conducted therethrough over time and the shape memory spring absorbs the heat energy and gradually assumes its second shape upon absorption of heat energy over time to closely match or mimic the time and temperature thermal deterioration profile of the product for which the device is to be used.

FIG. 9A shows the monitor 50 in the active position with the shape memory spring 52 and fluted disk 53 in the lowermost position after the device has been affixed to the food or product and given time to cool down. As the shape memory spring 52 exceeds its phase transition start temperature it begins to return to its remembered state and expands in length thereby forcing the fluted disk 53 upwardly in the housing. FIG. 9B shows the shape memory spring 52 and fluted disk 53 in a position indicating that the environment surrounding the food or product or package to which the monitor is attached has exceeded the threshold temperature, and has stayed above that temperature long enough to cause a significant degree of deterioration. The fluted disk 53 remains wedged in the upper portion of the housing 51 at the highest point at which the shape memory spring 52 was able to expand.

Figure 10C:
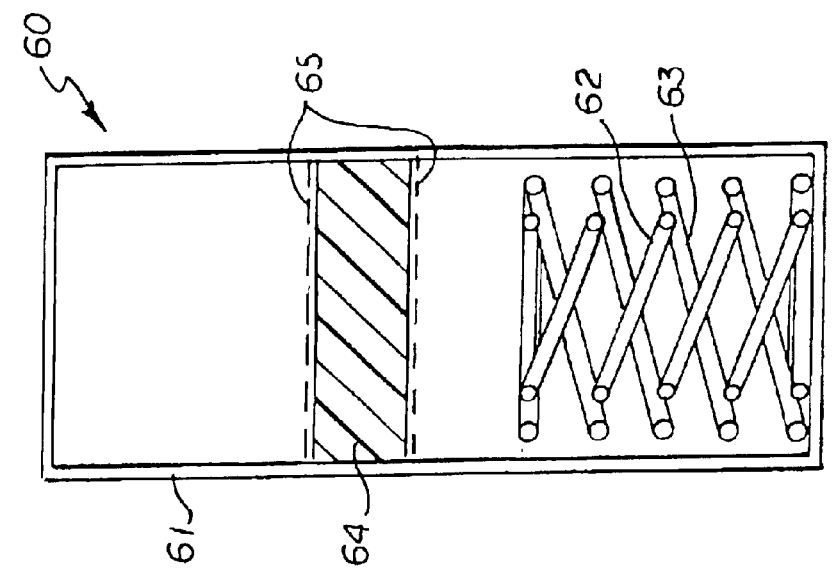
FIGS. 10A, 10B and 10C are enlarged longitudinal cross section views of a tubular embodiment of the disposable cumulative thermal exposure monitor utilizing a concentric pair of coiled springs formed of shape memory material.
Figure 10B:
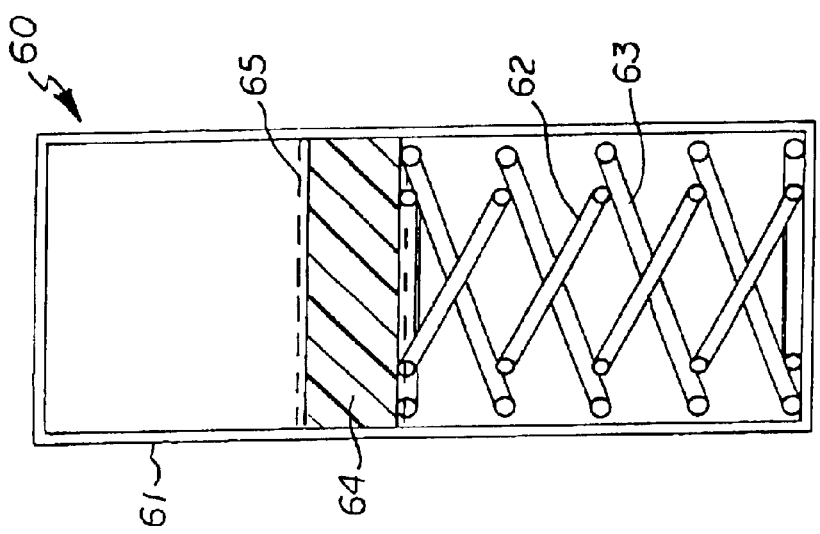
Figure 10A:
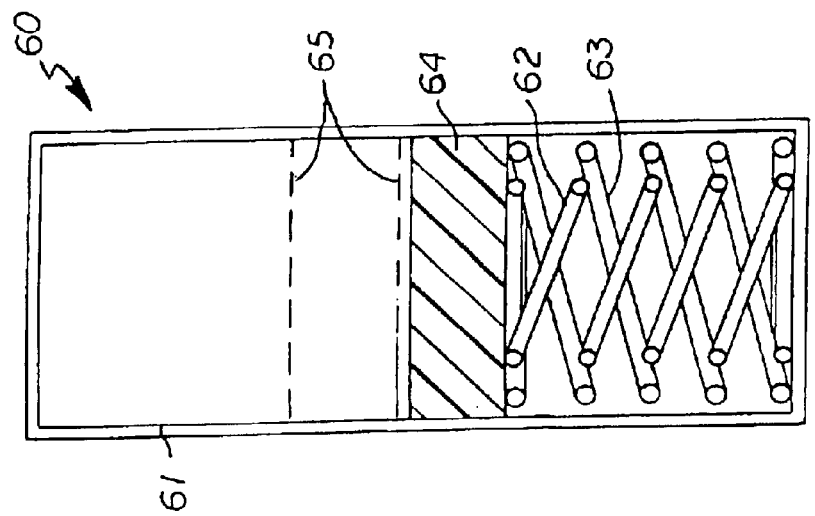

FIGS. 10A, 10B and 10C are enlarged longitudinal cross section views of a tubular embodiment of the disposable cumulative thermal exposure monitor 60 utilizing a concentric pair of coiled springs formed of shape memory materials that may be used as a cooling rate monitor. The outer housing 61 is a tubular member enclosed at each end and filled with a fluid such as propylene glycol or a gas, or the gas is removed to create a partial vacuum. As with the previous embodiments, the housing is formed of a rigid plastic or composite material that moderates heat energy conducted therethrough and may be capable of being sterilized by chemicals, heat or ionizing radiation. An adhesive material (not shown) may also be applied to the exterior surface of the outer housing for attaching the housing to a product or food packaging material.

In this embodiment, there are two concentric coil springs formed of shape memory alloy (SMA) or shape memory polymer (SMP) disposed in the lower portion of the tubular housing 61, each with a different phase transition temperature range. A smaller spring 62 is nested inside of a larger spring 63. The larger spring 63 has a remembered collapsed (reduced length) configuration and the smaller spring 62 has a remembered expanded (increased length) configuration. The two springs 62 and 63 are physically connected at both ends. The smaller spring 62 exhibits super elasticity; for example, its phase transition start temperature may be approximately −50° C. The larger spring 63 has a phase transition start temperature that is set to correspond to the threshold temperature of the product to be monitored.

A colored fluted disk 64 is slidably disposed inside the housing 61 at the top end of the springs 62 and 63. The disk 64 is sized to frictionally engage the interior side wall of the tubular housing 61 with sufficient force to prevent it from sliding due to gravity but allow it to slide under the force of the shape memory springs. The exterior of the housing 61 is provided with a transparent section 65 (represented by dashed lines) above the disk 64 in its lowermost position that allows the disk to be visually observed when moved upwardly into that section to indicate a degree of spoilage or deterioration of the particular product being monitored.

The material, thickness and thermally insulative properties of the housing are selected to provide a desired thermal capacity (the product of specific heat, volume and density), the shape memory material phase transition temperature range of each spring, and the fluid or partial vacuum in the cavity are calibrated relative to one another to function in mutual cooperation such that the housing moderates heat energy conducted therethrough over time and the larger shape memory spring 63 releases heat energy and gradually reduces its restraining force on the superelastic smaller spring 62 and they assume their respective second shapes upon dissipation of heat energy over time at a rate that to closely matches or mimics the time and temperature thermal deterioration characteristics of the product for which the device is to be used.

FIG. 10A shows the monitor 60 in the active position with the shape memory springs 62,63 and fluted disk 64 in the lowermost position after the device has been affixed to the food or product. In the initial starting configuration, the larger spring 63 compresses the smaller spring 62. As the larger spring 63 drops below its phase transition start temperature it can no longer restrain the smaller spring 62 it surrounds and it expands in length thereby forcing the fluted disk 64 upwardly in the housing. FIG. 10B shows the shape memory springs 62,63 and fluted disk 64 in a position indicating that the environment surrounding the food or product to which the monitor is attached has fallen below the threshold temperature (the temperature at which deterioration begins or significantly increases), and has stayed below that temperature long enough to cause a significant degree of deterioration of the product. As shown in FIG. 10C, if the food or product is re-warmed, the springs 62 and 63 reassume the initial lowermost (collapsed) position, however, the fluted disk 64 remains wedged in the upper portion of the housing 61 at the highest point at which the shape memory springs were able to expand.

Figure 11C:
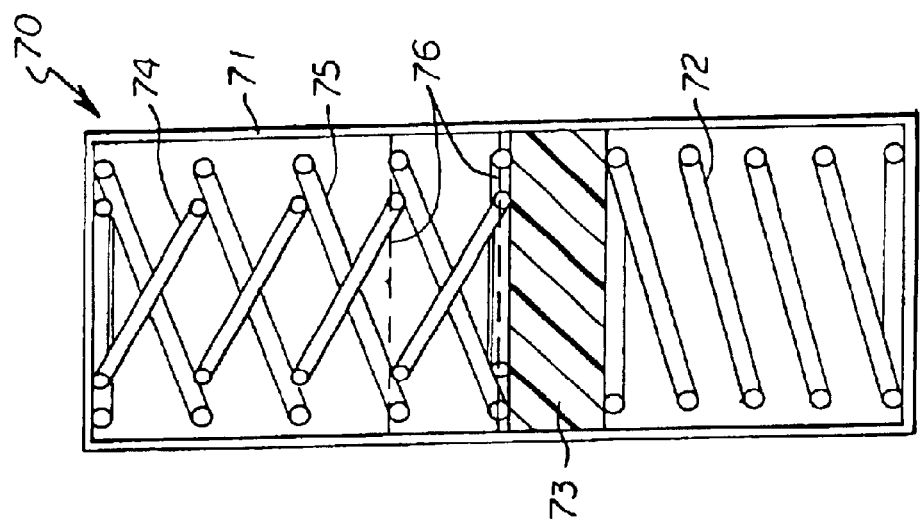
FIGS. 11A, 11B and 11C are enlarged longitudinal cross section views of a tubular embodiment of a self re-setting thermal exposure monitor utilizing a concentric pair of coiled springs and a third coil spring formed of shape memory material.
Figure 11B:
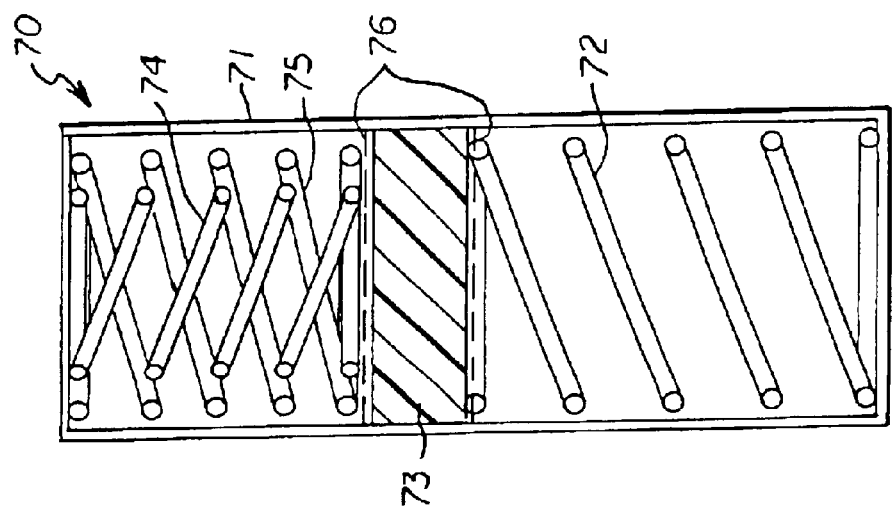
Figure 11A:
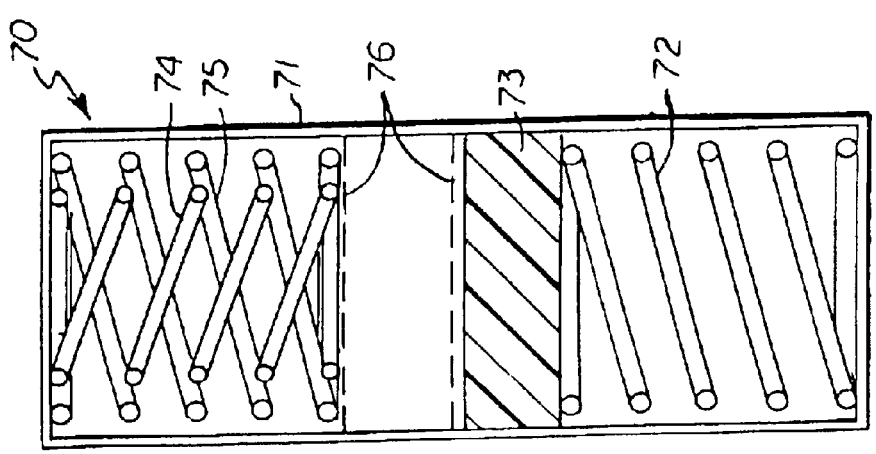

The following is an example of how the disposable tubular monitor embodiment of FIG. 10A may be used. A seafood processor knows that a certain parasite can be eliminated by exposure to a temperature below −20° C. for 5 hours. To answer this need the processor would affix a cooling rate monitor 60 to each of the containers of seafood before processing. After the processing was done a worker could tell at a glance if any specific container of seafood had been processed as required just by noting the position of the colored disk 64 in the monitor's window FIGS. 11A, 11B and 11C are enlarged longitudinal cross section views of a tubular embodiment of a self re-setting thermal exposure monitor 70 utilizing a concentric pair of coiled springs and a third coil spring formed of shape memory materials, each having a different phase transition temperature range. The outer housing 71 is a tubular member enclosed at each end and filled with a fluid such as propylene glycol or a gas, or the gas is removed to create a partial vacuum. As with the previous embodiments, the housing is formed of a rigid thermally conductive plastic or composite material that moderates heat energy conducted therethrough and may be capable of being sterilized by chemicals, heat or ionizing radiation. An adhesive material (not shown) may also be applied to the exterior surface of the outer housing for attaching the housing to a product or food packaging material.

In this embodiment, a coiled spring 72 formed of shape memory alloy (SMA) or shape memory polymer (SMP) material is disposed in the lower portion of the tubular housing 71. The spring 72 has a remembered expanded (increased length) configuration. A colored fluted disk 73 is slidably disposed inside housing 71 at the top end of the spring 72. The disk 73 is sized to frictionally engage the interior side wall of the tubular housing 71 with sufficient force to prevent it from sliding due to gravity but allow it to slide under the force of the shape memory springs.

Two concentric coil springs formed of shape memory alloy (SMA) or shape memory polymer (SMP) are disposed in the upper portion of the tubular housing 71 above the disk 73, each with a different phase transition temperature range. A smaller spring 74 is nested inside of a larger spring 75. The larger spring 75 has a remembered collapsed (reduced length) configuration and the smaller spring 74 has a remembered expanded (increased length) configuration. The two springs 74 and 75 are physically connected at both ends. The smaller spring 74 exhibits super elasticity; for example, its phase transition finish temperature normally would be approximately −50° C. The larger spring 75 has a phase transition start temperature (reset temperature) that is set to respond at a temperature sufficient to reset the device.

The exterior of the housing 71 is provided with a transparent section 76 (represented by dashed lines) above the disk 73 in its lowermost position that allows the disk to be visually observed when moved upwardly into that section to indicate a degree of spoilage or deterioration of the particular product being monitored.

The material, thickness and thermally insulative properties of the housing are selected to provide a desired thermal capacity (the product of specific heat, volume and density), the shape memory material phase transition temperature range of each spring, and the fluid or vacuum in the cavity are calibrated relative to one another to function in mutual cooperation such that the housing moderates heat energy conducted therethrough over time and the shape memory springs absorb the heat energy and gradually assume their respective second shapes upon absorption of heat energy over time to closely match or mimic the time and temperature thermal deterioration characteristics of the product for which the device is to be used.

FIG. 11A shows the monitor 70 in the active position with the shape memory springs 72, 74 and 75 and fluted disk 73 in their respective positions after the device has been affixed to the product and given time to cool down. In the initial starting configuration, the larger spring 75 compresses the smaller spring 74. As the lower shape memory spring 72 exceeds its phase transition start temperature it begins to return to its remembered state and expands in length thereby forcing the fluted disk 73 upwardly in the housing.

FIG. 11B shows the shape memory spring 72 and fluted disk 73 in a position indicating that the environment surrounding the product to which the monitor is attached has exceeded the threshold temperature (the temperature at which deterioration begins), and has stayed above that temperature long enough to cause significant deterioration.

FIG. 11C shows the shape memory springs 72, 74 and 75 and fluted disk 73 in the reset position indicating that the environment surrounding the product to which the monitor is attached has dropped below the reset temperature (phase transition start temperature of the larger spring). As the larger spring 75 drops below its phase transition start temperature it can no longer restrain the smaller spring 74 it surrounds and both springs expand in length thereby forcing the fluted disk downwardly and compressing the lower spring 72. Once the device is warmed back to the initial temperature level it will revert back to its original starting configuration (FIG. 11A).

The following is an example of how the self-resetting tubular monitor embodiment of FIG. 11A may be used. A genetic research supply company produces thermally unstable research reagents that must be kept at a temperature below −20° C. or they will become deteriorated to a point to where they are no longer useful. These products will last no more than 20 minutes at room temperature. Normally these reagents are shipped in special reusable insulated shipping packages, which are sent back to the company after use. Sometimes there are shipping delays and these products are held at a warehouse or elsewhere for a day or more. This may be a problem if there is not enough dry ice in the package. Often the researchers who purchase these products are not willing to accept them unless they know the product has been held below −20° C. for the entire trip. A self-resetting monitor 70 set to reset at −40° C. may be placed into the reusable packages by the supply company to provide proof of the state of the reagent, rather than relying on guesswork. The self-resetting device, when recycled, would automatically reset itself for the next trip (once dry ice was put into the package for the next trip) without human intervention.

It should be understood that shape memory polymers (SMP) and shape memory alloy materials (SMA) may be used in combination to augment the shape memory responses. Portions of the shape memory elements may also be annealed at different temperatures to produce different transition temperature ranges in various portions, to allow the monitors to respond differently to various heat stimuli and effectively monitor multiple time and temperature ranges. Other materials may be bonded, combined or applied to the shape memory elements to insulate or alter their thermodynamic characteristics.

The thermal exposure monitors of the present invention may also be provided with multiple shape memory elements with different phase transition temperature ranges free to move independently of one another and indicators means to show two or more different thermal deterioration rates. For example, one shape memory element may be set to respond at or near the threshold temperature and used to show cumulative heat exposure over time and another set at the threshold temperature so as to indicate the maximum temperature reached during use.

The cavity of the housings may be provided with a curved wall configured to create a uniform stress in the shape memory member when it is pressed against it. Uniform stress is desirable so as not to exceed the stress limits of the shape memory effect and to insure a homogenous transition temperature range. The cavity of the housings may also be provided with multiple curves of varying radius to provide a varying amount of stress to the shape memory member when it is retained against it. By varying the stress along the length of the shape memory member the phase transition temperature range can be varied along its length such that one portion of the shape memory member will undergo a shape change at a temperature slightly higher than the other portion.

While this invention has been described fully and completely with special emphasis upon preferred embodiments, it should be understood that within the scope of the appended claims the invention may be practiced otherwise than as specifically described herein.

What is claimed is:

1. A cumulative thermal exposure monitor for monitoring heat energy absorbed over time and indicating the degree of deterioration based on a time and temperature thermal deterioration profile of a perishable product that has a known time and temperature thermal deterioration profile and is prescribed to be maintained within a preferred storage temperature range, comprising:

a thermally-conductive housing having a fluid sealed interior cavity and a transparent window portion, said housing formed of a material having thermal capacity and insulative properties which moderate heat energy conducted therethrough over time;

a thermally-responsive member movably disposed in said interior cavity formed of a shape memory material selected from the group consisting of shape memory alloys and shape memory polymer composites having a phase transition temperature range encompassing at least the preferred storage temperature range and having a first shape at temperatures below said phase transition temperature range and gradually changing to a second shape at temperatures within or above the preferred storage temperature range; and indicator means visible through said window portion and associated with said thermally-responsive member to be moved from an initial position thereby as said thermally-responsive member gradually changes from said first shape to said second shape;

said thermal capacity and insulative properties of said housing material and said shape memory material phase transition temperature range calibrated relative to one another to function in mutual cooperation such that said housing moderates heat energy conducted therethrough over time and said thermally-responsive member absorbs the heat energy and gradually assumes its said second shape upon absorption of heat energy over time to closely match the known time and temperature thermal deterioration profile of the perishable product; and said indicator means remains substantially in a position at which it was last moved by said thermally-responsive member, regardless of subsequent exposures of said shape memory material to lower temperatures, to indicate the cumulative amount of heat energy absorbed in and above said preferred storage temperature range and whether, at any time, the temperature has been above said preferred storage temperature range for a period of time sufficient to cause any degree of deterioration based on the time and temperature thermal deterioration profile of the perishable product.

2. The thermal exposure monitor according to claim 1, wherein said fluid sealed interior cavity is filled with a fluid having thermal capacity and insulative properties that moderate heat energy conducted therethrough over time and calibrated to function in mutual cooperation with said thermal capacity and insulative properties of said housing material and said shape memory material phase transition temperature range such that said thermally-responsive member absorbs the heat energy and gradually assumes its said second shape upon absorption of heat energy over time to closely match the known time and temperature thermal deterioration profile of the perishable product.

3. The thermal exposure monitor according to claim 2, wherein said fluid is a gas at a pressure below ambient air pressure to form a partial vacuum in said cavity.

4. The thermal exposure monitor according to claim 1, further comprising:

scale means on said housing adjacent to said window portion having calibrations thereon representing degrees of deterioration based on the time and temperature thermal deterioration profile of the perishable product.

5. The thermal exposure monitor according to claim 1, further comprising:

scale means on said housing adjacent to said window portion having calibrations thereon representing the cumulative amount of heat energy absorbed in and above said preferred storage temperature range.

6. The thermal exposure monitor according to claim 1, wherein said thermally-responsive member is a thin strip or wire of shape memory material having a curved first shape at temperatures below said phase transition temperature range and gradually changing to a remembered straight second shape at temperatures in and above said preferred storage temperature range;

said thermally-responsive member anchored at one end and having a free end movable across said window portion; and said indicator means is secured to said free end and visible in said window portion as said thermally-responsive member changes from said first shape to said second shape.

7. The thermal exposure monitor according to claim 1, wherein said thermally-responsive member is a coil formed of shape memory alloy material having a first shape of a shorter coiled configuration at temperatures below said phase transition temperature range and changing to a remembered second shape of a longer coiled configuration at temperatures within and above said preferred storage temperature range; and said indicator means in its said initial position is disposed at one end of said coiled configuration and travels across said window portion as said thermally-responsive member changes to said longer coiled configuration.

8. The thermal exposure monitor according to claim 7, wherein said housing is a hollow tubular configuration enclosed at each end and defining said fluid sealed interior cavity; and said coil and said indicator means are movably disposed in said interior cavity.

9. The thermal exposure monitor according to claim 1, wherein said thermally-responsive member comprises a first coil and a second coil each formed of shape memory material and each having a different phase transition temperature range and a prescribed phase transition start temperature, said first coil and said second coil disposed in concentric nested relation and joined together at each of their ends;

said first coil having a first shape of a compressed shorter coiled configuration and changing to a remembered second shape of a longer coiled configuration above its phase transition start temperature;

said second coil having a remembered shape of a shorter coiled configuration at temperatures above it's said phase transition start temperature, said second coil phase transition start temperature corresponding to a threshold temperature at which deterioration of the product begins or significantly increases;

said second coil restraining said first coil from changing to its said longer coiled configuration until the temperature of said second coil drops below its said phase transition start temperature and thereafter said first coil becomes unrestrained, and said first and said second coils both assuming their said longer coiled configuration upon exposure to temperatures below said threshold temperature for a prescribed period of time; and said indicator means in its said initial position is disposed at one end of said nested first and second coils when said first coil is restrained by said second coil and travels across said window portion as both said coils assume said longer coiled configuration.

10. The thermal exposure monitor according to claim 9, wherein upon subsequent exposure to temperatures above said threshold temperature both said first and said second coils assume said shorter coiled configuration with said first coil restrained by said second coil; and said indicator means remains substantially in a position at which it was last moved by both said coils, regardless of subsequent exposures of said shape memory material to higher temperatures, to indicate the cumulative amount of heat energy lost below said second coil's phase transition temperature range and whether, at any time, the cumulative heat energy lost has taken place for a period of time sufficient to cause any degree of deterioration based on the time and temperature thermal deterioration profile of the perishable product.

11. The thermal exposure monitor according to claim 1, wherein said thermally-responsive member is a first coil formed of shape memory material having a phase transition temperature range and a first shape of a shorter coiled configuration and changing to a remembered second shape of a longer coiled configuration at temperatures above a prescribed phase transition start; and further comprising:

a second coil and a third coil each formed of shape memory material and each having a phase transition temperature range and a prescribed phase transition start temperature different from one another and from said first coil, said second coil and said third coil disposed in concentric nested relation and joined together at each of their ends;

said second coil start temperature being lower than the start temperature of said third coil and having a first shape of a compressed shorter coiled configuration and changing to a remembered second shape of a longer coiled configuration at its said phase transition start temperature;

said third coil having a start temperature well below said phase transition start temperature of said first coil and having a remembered shape of a shorter coiled configuration;

said third coil restraining said second coil from changing to its said longer coiled configuration until the temperature of said third coil drops below its said phase transition start temperature and thereafter said second coil becomes unrestrained, and said second and said third coils both assuming said longer coiled configuration upon exposure to temperatures below said phase transition start temperature of said third coil;

said indicator means in its said initial position having one side disposed at one end of said first coil in its said shorter coiled configuration and travels across said window portion as said first coil changes to its said longer coiled configuration; and upon the temperature of said third coil dropping below its said phase transition start temperature, said second coil becoming unrestrained, and said second and said third coils both assuming said longer coiled configuration to engage said indicator means to move said indicator means to said initial position and said first coil to its said shorter coiled configuration and thereby reset said monitor for subsequent use.

12. The thermal exposure monitor according to claim 11, wherein
   said housing is a hollow tubular configuration enclosed at each end and defining said fluid sealed interior cavity;
   said first coil is disposed in said interior cavity at one end of said tubular configuration, said second and third coil members are disposed in said interior cavity at the other end thereof; and
   said indicator means is movably disposed in said interior cavity between said first coil and said nested second and third coils.

13. A cumulative thermal exposure monitor for monitoring heat energy absorbed over time and indicating the degree of deterioration based on a time and temperature thermal deterioration profile of a perishable product that has a known time and temperature thermal deterioration profile and is prescribed to be maintained within a preferred storage temperature range, comprising:
   a thermally-conductive housing having a fluid sealed interior cavity and a transparent window portion, said housing formed of a material having thermal capacity and insulative properties which moderate heat energy conducted therethrough over time;
   a thermally-responsive member movably disposed in said interior cavity formed of a shape memory material selected from the group consisting of shape memory alloys and shape memory polymer composites having a phase transition temperature range encompassing at least the preferred storage temperature range and having a first shape at temperatures below said phase transition temperature range and gradually changing to a second shape at temperatures within or above the preferred storage temperature range;
   indicator means visible through said window portion and associated with said thermally-responsive member to be moved from an initial position thereby as said thermally-responsive member gradually changes from said first shape to said second shape; and
   movable latch means having one end disposed in said housing engageable with said indicator means for holding said thermally-responsive member in its said first shape until ready for use and thereafter being disengaged therefrom to allow said thermally-responsive member to change to its said second shape;
   said thermal capacity and insulative properties of said housing material and said shape memory material phase transition temperature range calibrated relative to one another to function in mutual cooperation such that said housing moderates heat energy conducted therethrough over time and said thermally-responsive member absorbs the heat energy and gradually assumes its said second shape upon absorption of heat energy over time to closely match the known time and temperature thermal deterioration profile of the perishable product; and
   said indicator means remains substantially in a position at which it was last moved by said thermally-responsive member, regardless of subsequent exposures of said shape memory material to lower temperatures, to indicate the cumulative amount of heat energy absorbed in and above said preferred storage temperature range and whether, at any time, the temperature has been above said preferred storage temperature range for a period of time sufficient to cause any degree of deterioration based on the time and temperature thermal deterioration profile of the perishable product.

14. The thermal exposure monitor according to claim 13, wherein:
   said movable latch means is a latch member formed of a thin strip or wire of shape memory material selected from the group consisting of shape memory alloys and shape memory polymer composites having an initial remembered configuration above a prescribed phase transition start temperature and changing to a second configuration below said prescribed phase transition start temperature;
   said latch phase transition start temperature being greater than the phase transition start temperature of said thermally-responsive member; and
   said latch member in its said initial remembered configuration is engaged with said indicator means to hold said thermally-responsive member in its said first shape and upon said latch member dropping below its said prescribed phase transition start temperature changes to its said second configuration, and said thermally-responsive member, upon reaching its said phase transition start temperature, moves said latch member to a disengaged position as it changes to its said second shape.

15. The thermal exposure monitor according to claim 14, wherein:
   said movable latch means is a latch member formed of a thin strip or wire of shape memory material selected from the group consisting of shape memory alloys and shape memory polymer composites having a phase transition temperature range and an initial remembered configuration above a prescribed phase transition start temperature and changing to a second configuration at or below said prescribed phase transition start temperature; and
   said latch member in its said initial remembered configuration is engaged with said indicator means to hold said thermally-responsive member in its said first shape and upon said latch member reaching its said prescribed phase transition start temperature changing to its said second configuration and becoming disengaged therefrom to allow said thermally-responsive member to change to its said second shape.

16. The thermal exposure monitor according to claim 15, wherein
   said thermally-responsive member has a first shape in the form of an inverted wide generally V-shaped configuration and a remembered second shape in the form of an inverted narrow generally V-shaped configuration; and
   said movable latch means has one end disposed in said housing engageable with the apex of said thermally-responsive member for holding said thermally-responsive member in its said first shape until ready for use and thereafter being disengaged therefrom to allow said thermally-responsive member to change to its said second shape.

17. The thermal exposure monitor according to claim 16, wherein
   said fluid sealed interior cavity has a first compartment and an adjoining second compartment;

said thermally-responsive member is movably disposed in said first compartment in its said inverted wide generally V-shaped configuration and the apex of the V-shape moving into said second compartment when said thermally-responsive member changes to its said inverted narrow generally V-shaped configuration; and said indicator means is movably disposed in said adjacent second compartment to be moved therein as said thermally-responsive member changes to its said inverted narrow generally V-shaped configuration.

18. A cumulative thermal exposure monitor for monitoring heat energy absorbed over time and indicating the degree of deterioration based on a time and temperature thermal deterioration profile of a perishable product that has a known time and temperature thermal deterioration profile and is prescribed to be maintained within a preferred storage temperature range, comprising:

a thermally-conductive housing having a fluid sealed interior cavity and a transparent window portion, said housing formed of a material having thermal capacity and insulative properties which moderate heat energy conducted therethrough over time;

a thermally-responsive member movably disposed in said interior cavity formed of a shape memory material selected from the group consisting of shape memory alloys and shape memory polymer composites having a phase transition temperature range encompassing at least the preferred storage temperature range and having a first shape at temperatures below said phase transition temperature range and gradually changing to a second shape at temperatures within or above the preferred storage temperature range; and indicator means visible through said window portion and associated with said thermally-responsive member to be moved from an initial position thereby as said thermally-responsive member gradually changes from said first shape to said second shape;

an alterable film material disposed in said housing closely adjacent to said indicator means and said thermally-responsive member; and film altering means carried by either of said indicator means or said thermally-responsive member for altering said film material;

said thermal capacity and insulative properties of said housing material and said shape memory material phase transition temperature range calibrated relative to one another to function in mutual cooperation such that said housing moderates heat energy conducted therethrough over time and said thermally-responsive member absorbs the heat energy and gradually assumes its said second shape upon absorption of heat energy over time to closely match the known time and temperature thermal deterioration profile of the perishable product;

said indicator means remaining substantially in a position at which it was last moved by said thermally-responsive member, regardless of subsequent exposures of said shape memory material to lower temperatures, to indicate the cumulative amount of heat energy absorbed in and above said preferred storage temperature range and whether, at any time, the temperature has been above said preferred storage temperature range for a period of time sufficient to cause any degree of deterioration based on the time and temperature thermal deterioration profile of the perishable product; and said film material is altered by said film altering means with respect to time and location of either said indicator means or said thermally-responsive member as said thermally-responsive member changes from said first shape to said second shape to provide a time and temperature log of environmental thermal events including the cumulative amount of heat energy absorbed in said phase transition temperature range over a period of time.

19. The cumulative thermal exposure monitor according to claim 18, wherein said alterable film material is selected from the group consisting of optically stimulated luminescence material, thermo-luminescence material, photochromic material, and radiochromic material disposed in said housing closely adjacent to said indicator means and said thermally-responsive member;

said film altering means comprises a radiation emitting substance contained in or on either of said indicator means or said thermally-responsive member to effect said film material; and said film is altered by exposure to said radiation emitting substance with respect to time and location of said indicator means and said thermally-responsive member as said thermally-responsive member changes from said first shape to said second shape.

20. The cumulative thermal exposure monitor according to claim 18, wherein said alterable film material contains magnetic or paramagnetic particles of selected colors and non-magnetic white or light colored pigment of a different color distributed in a viscous support media said film altering means comprises a magnetic material contained in or on either of said indicator means or said thermally-responsive member; and said film is altered by magnetic attraction of said magnetic and paramagnetic particles to display a gradient of colored particle concentrations relative to time and location of said indicator means and said thermally-responsive member as said thermally-responsive member changes from said first shape to said second shape.

* * * * *